US012700741B2

(12) United States Patent
Clarke et al.

(10) Patent No.: US 12,700,741 B2
(45) Date of Patent: *Aug. 4, 2026

(54) BATTERY BOOSTER

(71) Applicant: Schumacher Electric Corporation, Fort Worth, TX (US)

(72) Inventors: Patrick J. Clarke, St. Charles, IL (US); Brian F. Butler, Chicago, IL (US); Xiao Ping Chen, Buffalo Grove, IL (US); Barry O'Dell, Fort Worth, TX (US); Ronald Walkup, Palatine, IL (US); John S. Whiting, Hampshire, IL (US)

(73) Assignee: Schumacher Electric Corporation, Fort Worth, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/637,951

(22) Filed: Apr. 17, 2024

(65) Prior Publication Data

US 2024/0283281 A1     Aug. 22, 2024

Related U.S. Application Data

(63) Continuation of application No. 17/505,251, filed on Oct. 19, 2021, now Pat. No. 11,973,366.

(Continued)

(51) Int. Cl.
*H02J 7/34* (2006.01)
*B60R 16/033* (2006.01)
(Continued)

(52) U.S. Cl.
CPC ............ *H02J 7/345* (2013.01); *B60R 16/033* (2013.01); *H01M 10/44* (2013.01); *H02J 7/64* (2026.01);
(Continued)

(58) Field of Classification Search
CPC ...... H02J 7/345; H02J 7/00308; H02J 7/0034; H02J 7/00714; H02J 2207/50;
(Continued)

(56) References Cited

U.S. PATENT DOCUMENTS

| | | | |
|---|---|---|---|
| 3,343,057 A | 9/1967 | Smith | |
| 3,590,357 A | 6/1971 | Reid | |
| | (Continued) | | |

FOREIGN PATENT DOCUMENTS

| | | | |
|---|---|---|---|
| CN | 2313331 Y | 4/1999 | |
| CN | 2773818 Y | 4/2006 | |
| | (Continued) | | |

OTHER PUBLICATIONS

Cunningham, Wayne, Three pocket-size jump starters, http://www.cnet.com/news/pocket-sized-jump-starters/, Apr. 28, 2014 (7 pages).

(Continued)

*Primary Examiner* — M Baye Diao
(74) *Attorney, Agent, or Firm* — Michael Stanley Tomsa; McAndrews, Held & Malloy, Ltd.

(57) ABSTRACT

Described is a battery booster for jumpstarting a vehicle having an external battery. The battery booster includes a set of electrical conductors, a power supply to supply a starting current to jump start the vehicle via the set of electrical conductors, a boost switch positioned in-line between the power supply and a set of battery clamps on one of the set of electrical conductors; and at least one processor to output a control signal to close the boost switch as a function of one or more parameters of the power supply, the external battery, and/or the vehicle. The set of electrical conductors couple with the external battery or with an engine that is electrically coupled with the external battery via the set of battery clamps. The set of electrical conductors includes a positive electrical conductor and a negative electrical conductor. The (Continued)

power supply includes a plurality of lithium battery cells arranged to form a lithium battery having a positive terminal and a negative terminal.

20 Claims, 17 Drawing Sheets

Related U.S. Application Data

(60) Provisional application No. 63/145,855, filed on Feb. 4, 2021, provisional application No. 63/126,637, filed on Dec. 17, 2020, provisional application No. 63/094,209, filed on Oct. 20, 2020.

(51) Int. Cl.
| | |
|---|---|
| *H01M 10/44* | (2006.01) |
| *H02J 7/64* | (2026.01) |
| *H02J 7/68* | (2026.01) |
| *H02J 7/94* | (2026.01) |

(52) U.S. Cl.
CPC ................. *H02J 7/68* (2026.01); *H02J 7/94* (2026.01); *H02J 2207/50* (2020.01)

(58) Field of Classification Search
CPC ...... H02J 7/0031; H02J 7/0045; H02J 7/0069; H02J 1/122; H02J 7/0048; H02J 7/342; B60R 16/033; H01M 10/44; H01M 10/635; H01M 10/657; H01M 2010/4271; H01M 2220/30; H01M 10/615; H01M 10/623; H01M 10/637; H01M 10/4257; H01M 2220/20; Y02E 60/10
USPC ........................................................ 320/104
See application file for complete search history.

(56) References Cited

U.S. PATENT DOCUMENTS

| | | | |
|---|---|---|---|
| 3,778,632 A | 12/1973 | Sarbacher | |
| 3,950,688 A | 4/1976 | Sancey et al. | |
| 4,079,304 A | 3/1978 | Brandenburg | |
| 4,829,223 A | 5/1989 | Broberg et al. | |
| 4,925,750 A | 5/1990 | Theiss | |
| 4,983,473 A | 1/1991 | Smith | |
| 5,194,799 A | 3/1993 | Tomantschger | |
| 5,424,936 A | 6/1995 | Reddy | |
| 5,465,011 A | 11/1995 | Miller et al. | |
| 5,589,292 A | 12/1996 | Rozon | |
| 5,678,077 A | 10/1997 | Ichikawa et al. | |
| 5,741,305 A | 4/1998 | Vincent et al. | |
| 5,764,030 A | 6/1998 | Gaza | |
| 5,793,185 A | 8/1998 | Prelec et al. | |
| 5,796,255 A | 8/1998 | McGowan | |
| 5,814,972 A | 9/1998 | Shimada et al. | |
| 6,020,719 A | 2/2000 | Nishigaki et al. | |
| 6,130,519 A | 10/2000 | Whiting et al. | |
| 6,140,797 A | 10/2000 | Dunn | |
| 6,155,870 A | 12/2000 | Valentine | |
| 6,198,249 B1 | 3/2001 | Kroll et al. | |
| 6,215,273 B1 | 4/2001 | Shy | |
| 6,344,733 B1 | 2/2002 | Crass et al. | |
| 6,356,050 B1 | 3/2002 | Hussaini | |
| 6,377,029 B1 | 4/2002 | Krieger et al. | |
| 6,380,712 B2 | 4/2002 | Murphy et al. | |
| 6,384,573 B1 | 5/2002 | Dunn | |
| 6,424,158 B2 | 7/2002 | Klang | |
| 6,466,025 B1 | 10/2002 | Klang | |
| 6,502,044 B1 | 12/2002 | Lane et al. | |
| 6,625,477 B1 | 9/2003 | Wakefield | |
| 6,679,212 B2 | 1/2004 | Kelling | |
| 6,756,764 B2 | 6/2004 | Smith | |
| 6,788,025 B2 | 9/2004 | Bertness et al. | |

| | | | |
|---|---|---|---|
| 6,799,993 B2 | 10/2004 | Krieger et al. | |
| 6,819,010 B2 | 11/2004 | Burke | |
| 6,871,151 B2 | 3/2005 | Bertness | |
| 6,871,625 B1 | 3/2005 | Burke | |
| 6,943,666 B2 | 9/2005 | Mooney et al. | |
| 6,988,475 B2 | 1/2006 | Burke | |
| 7,003,411 B2 | 2/2006 | Bertness | |
| 7,015,674 B2 | 3/2006 | VonderHaar | |
| 7,161,253 B2 | 1/2007 | Sodeman | |
| 7,161,476 B2 | 1/2007 | Hardman et al. | |
| 7,180,200 B2 | 2/2007 | Nalter et al. | |
| 7,301,303 B1 | 11/2007 | Hulden | |
| 7,309,928 B2 | 12/2007 | Grant et al. | |
| 7,339,347 B2 | 3/2008 | Elder et al. | |
| 7,345,450 B2 | 3/2008 | Krieger et al. | |
| 7,408,358 B2 | 8/2008 | Knopf | |
| 7,498,767 B2 | 3/2009 | Brown et al. | |
| 7,501,795 B2 | 3/2009 | Bertness et al. | |
| 7,528,579 B2 | 5/2009 | Pacholok et al. | |
| 7,598,743 B2 | 10/2009 | Bertness | |
| 7,656,118 B2 | 2/2010 | Krieger et al. | |
| 7,687,926 B2 | 3/2010 | Grant et al. | |
| 7,772,850 B2 | 8/2010 | Bertness | |
| 7,774,151 B2 | 8/2010 | Bertness | |
| 7,808,211 B2 | 10/2010 | Pacholok et al. | |
| 7,808,375 B2 | 10/2010 | Bertness et al. | |
| 7,834,593 B2 | 11/2010 | Johnson et al. | |
| 7,915,856 B2 | 3/2011 | Krampitz et al. | |
| 7,924,015 B2 | 4/2011 | Bertness | |
| 7,989,969 B2 | 8/2011 | Grant et al. | |
| 8,013,567 B2 | 9/2011 | Windsor | |
| 8,120,364 B2 | 2/2012 | Elder et al. | |
| 8,179,103 B2 | 5/2012 | Doljack | |
| 8,188,708 B2 | 5/2012 | Altekruse et al. | |
| 8,237,412 B2 | 8/2012 | Johnson et al. | |
| 8,319,357 B2 | 11/2012 | Usselman et al. | |
| 8,386,199 B2 | 2/2013 | Goff et al. | |
| 8,437,908 B2 | 5/2013 | Goff et al. | |
| 8,513,949 B2 | 8/2013 | Bertness | |
| 8,558,690 B2 | 10/2013 | Kleve et al. | |
| 8,575,899 B2 | 11/2013 | Whiting et al. | |
| 8,576,061 B2 | 11/2013 | Miller et al. | |
| 8,610,396 B2 | 12/2013 | Hunter et al. | |
| 8,664,912 B2 | 3/2014 | Olsberg | |
| 8,664,915 B2 | 3/2014 | Sutardja | |
| 8,674,654 B2 | 3/2014 | Bertness | |
| 8,759,991 B2 | 6/2014 | Grant et al. | |
| 8,854,013 B2 | 10/2014 | Gao et al. | |
| 8,872,516 B2 | 10/2014 | Bertness | |
| 8,928,172 B2 * | 1/2015 | Goto ................... F02N 11/0814 |
| | | | 307/9.1 |
| 8,947,054 B2 | 2/2015 | Johnson et al. | |
| 8,957,610 B2 * | 2/2015 | Lee .......................... H02J 7/575 |
| | | | 318/140 |
| 8,958,998 B2 | 2/2015 | Bertness | |
| 9,007,015 B1 | 4/2015 | Nook et al. | |
| 9,013,323 B2 | 4/2015 | Grothaus et al. | |
| 9,018,958 B2 | 4/2015 | Bertness | |
| 9,060,213 B2 | 6/2015 | Jones | |
| 9,216,659 B2 | 12/2015 | Seo et al. | |
| 9,219,369 B2 | 12/2015 | Mehta et al. | |
| 9,260,067 B2 | 2/2016 | Kai | |
| 9,263,907 B2 | 2/2016 | Richardson et al. | |
| 9,276,438 B2 | 3/2016 | Grant et al. | |
| 9,371,067 B2 | 6/2016 | Dao et al. | |
| 9,506,446 B2 | 11/2016 | Xinfang | |
| 9,525,297 B2 | 12/2016 | Wang | |
| 9,553,460 B2 | 1/2017 | Dao et al. | |
| 9,581,654 B2 | 2/2017 | Campbell et al. | |
| 9,653,933 B2 | 5/2017 | Inskeep | |
| 9,673,652 B2 | 6/2017 | Inskeep | |
| 9,768,435 B2 | 9/2017 | Koebler et al. | |
| 9,770,992 B2 | 9/2017 | Nook et al. | |
| 9,819,204 B2 | 11/2017 | Miller et al. | |
| 9,954,207 B2 | 4/2018 | Koebler | |
| 10,087,904 B2 | 10/2018 | Butler et al. | |
| 10,174,736 B2 | 1/2019 | Hang | |
| 10,363,824 B1 * | 7/2019 | Lumpkin ................ B60L 53/14 |
| 10,389,139 B2 | 8/2019 | Velderman et al. | |

(56) References Cited

U.S. PATENT DOCUMENTS

| | | | |
|---|---|---|---|
| 10,587,125 B2 | 3/2020 | Edwards et al. | |
| 10,826,286 B2 * | 11/2020 | Guo | H02J 7/663 |
| 11,001,212 B2 | 5/2021 | Wang | |
| 11,211,784 B2 * | 12/2021 | Wakazono | H02J 7/68 |
| 11,378,052 B2 | 7/2022 | Iwaki | |
| 11,674,490 B2 * | 6/2023 | Clarke | F02N 11/0862 |
| | | | 123/179.1 |
| 11,973,366 B2 * | 4/2024 | Clarke | H01M 10/4257 |
| 2001/0038276 A1 | 11/2001 | Resch et al. | |
| 2002/0008523 A1 | 1/2002 | Klang | |
| 2002/0041174 A1 | 4/2002 | Prelec et al. | |
| 2002/0145404 A1 | 10/2002 | Dasgupta et al. | |
| 2002/0167296 A1 | 11/2002 | Nagata et al. | |
| 2003/0052645 A1 | 3/2003 | Sasaki | |
| 2003/0137277 A1 | 7/2003 | Ichiro | |
| 2003/0169022 A1 | 9/2003 | Turner et al. | |
| 2004/0052022 A1 | 3/2004 | Laraia | |
| 2004/0130298 A1 | 7/2004 | Krieger et al. | |
| 2004/0239290 A1 | 12/2004 | Krieger | |
| 2004/0251876 A1 | 12/2004 | Bertness | |
| 2005/0035667 A1 * | 2/2005 | Joannou | H02J 7/751 |
| | | | 307/125 |
| 2005/0065558 A1 | 3/2005 | Powers et al. | |
| 2005/0088626 A1 | 4/2005 | Huang | |
| 2005/0258797 A1 * | 11/2005 | Hung | H02J 7/342 |
| | | | 320/105 |
| 2005/0285445 A1 | 12/2005 | Wruck et al. | |
| 2006/0006841 A1 | 1/2006 | Lee | |
| 2006/0019150 A1 | 1/2006 | Rigobert et al. | |
| 2006/0133007 A1 | 6/2006 | Shiue et al. | |
| 2006/0244412 A1 * | 11/2006 | Bonzer | H02J 7/342 |
| | | | 320/105 |
| 2007/0063675 A1 | 3/2007 | Walline et al. | |
| 2007/0278990 A1 | 12/2007 | Raichle et al. | |
| 2007/0285049 A1 | 12/2007 | Krieger | |
| 2008/0061733 A1 | 3/2008 | Toya | |
| 2008/0129219 A1 | 6/2008 | Smith et al. | |
| 2008/0218104 A1 | 9/2008 | Lukic et al. | |
| 2008/0246443 A1 | 10/2008 | Doljack | |
| 2008/0265844 A1 | 10/2008 | Smith et al. | |
| 2008/0275737 A1 | 11/2008 | Gentry et al. | |
| 2009/0171600 A1 | 7/2009 | Machiyama | |
| 2009/0174362 A1 | 7/2009 | Richardson | |
| 2009/0187077 A1 | 7/2009 | Hosoda et al. | |
| 2009/0218988 A1 | 9/2009 | Richardson et al. | |
| 2009/0246596 A1 | 10/2009 | Sridhar | |
| 2010/0039065 A1 | 2/2010 | Kinkade, Jr. | |
| 2010/0072946 A1 | 3/2010 | Sugano | |
| 2010/0117591 A1 | 5/2010 | Thomas et al. | |
| 2010/0235087 A1 | 9/2010 | Mimura | |
| 2010/0241377 A1 | 9/2010 | Kagawa | |
| 2010/0301800 A1 | 12/2010 | Inskeep | |
| 2010/0315046 A1 | 12/2010 | Trainor et al. | |
| 2011/0012553 A1 | 1/2011 | Sloan et al. | |
| 2011/0029157 A1 | 2/2011 | Muzaffer | |
| 2011/0046831 A1 | 2/2011 | Ananthakrishna | |
| 2011/0074350 A1 | 3/2011 | Kocher | |
| 2011/0095728 A1 | 4/2011 | Chen et al. | |
| 2011/0100735 A1 | 5/2011 | Flett | |
| 2011/0130905 A1 | 6/2011 | Mayer | |
| 2011/0133689 A1 | 6/2011 | Uchihashi et al. | |
| 2011/0183184 A1 | 7/2011 | Jan | |
| 2011/0206950 A1 | 8/2011 | Doege | |
| 2011/0258112 A1 | 10/2011 | Eder et al. | |
| 2012/0019190 A1 | 1/2012 | Jones et al. | |
| 2012/0068662 A1 | 3/2012 | Durando | |
| 2012/0091944 A1 | 4/2012 | Rogers | |
| 2012/0105010 A1 | 5/2012 | Kinoshita | |
| 2012/0133309 A1 * | 5/2012 | Sean | H02J 7/14 |
| | | | 318/139 |
| 2012/0140752 A1 | 6/2012 | Yun | |
| 2012/0235473 A1 | 9/2012 | Jiang et al. | |
| 2012/0309315 A1 | 12/2012 | Sakata | |
| 2013/0002049 A1 | 1/2013 | Stampfli | |
| 2013/0020993 A1 | 1/2013 | Taddeo | |
| 2013/0086409 A1 | 4/2013 | Lu et al. | |
| 2013/0099738 A1 | 4/2013 | Brockman et al. | |
| 2013/0241498 A1 | 9/2013 | Koebler | |
| 2013/0264875 A1 | 10/2013 | Kaminsky et al. | |
| 2013/0310112 A1 | 11/2013 | You et al. | |
| 2014/0013128 A1 | 1/2014 | Wong | |
| 2014/0084844 A1 | 3/2014 | Weflen | |
| 2014/0088827 A1 | 3/2014 | Yashiro | |
| 2014/0107864 A1 | 4/2014 | Cecchini | |
| 2014/0139175 A1 | 5/2014 | Gonzalez | |
| 2014/0159509 A1 | 6/2014 | Inskeep | |
| 2014/0253017 A1 | 9/2014 | Kominami et al. | |
| 2014/0266013 A1 * | 9/2014 | Becker | H02J 7/865 |
| | | | 320/109 |
| 2014/0300310 A1 | 10/2014 | Caren | |
| 2014/0300311 A1 | 10/2014 | Caren et al. | |
| 2014/0368155 A1 * | 12/2014 | Chen | B60R 16/033 |
| | | | 307/9.1 |
| 2015/0102781 A1 | 4/2015 | Inskeep | |
| 2015/0130400 A1 | 5/2015 | Inskeep | |
| 2015/0168499 A1 | 6/2015 | Palmisano | |
| 2015/0372531 A1 | 12/2015 | Tanabe | |
| 2016/0072323 A1 | 3/2016 | Miller et al. | |
| 2016/0072329 A1 | 3/2016 | Miller et al. | |
| 2016/0181587 A1 | 6/2016 | Koebler et al. | |
| 2016/0226266 A1 * | 8/2016 | Huang | H02J 1/02 |
| 2016/0238667 A1 | 8/2016 | Palmisano et al. | |
| 2016/0268645 A1 | 9/2016 | Koebler | |
| 2017/0012448 A1 | 1/2017 | Miller et al. | |
| 2017/0067952 A1 | 3/2017 | Clarke et al. | |
| 2017/0110766 A1 | 4/2017 | Koebler | |
| 2017/0163066 A1 | 6/2017 | Inskeep et al. | |
| 2017/0288435 A1 | 10/2017 | Miller et al. | |
| 2017/0310153 A1 | 10/2017 | Inskeep | |
| 2017/0317492 A1 | 11/2017 | Koebler | |
| 2017/0335817 A1 | 11/2017 | De Lise et al. | |
| 2017/0346140 A1 | 11/2017 | Koebler | |
| 2018/0048168 A1 | 2/2018 | Miller et al. | |
| 2018/0111491 A1 | 4/2018 | Nook et al. | |
| 2018/0215274 A1 | 8/2018 | Nook et al. | |
| 2018/0233934 A1 | 8/2018 | Miller et al. | |
| 2018/0342883 A1 | 11/2018 | Inskeep et al. | |
| 2019/0081472 A1 * | 3/2019 | Guo | H02J 7/663 |
| 2020/0067333 A1 | 2/2020 | Wekwert et al. | |
| 2020/0072177 A1 | 3/2020 | Clarke et al. | |
| 2020/0295575 A1 | 9/2020 | Nook et al. | |

FOREIGN PATENT DOCUMENTS

| | | |
|---|---|---|
| CN | 204465081 U | 7/2015 |
| EP | 2712757 A2 | 4/2014 |
| EP | 3211755 A1 | 2/2017 |
| JP | 2013-100040 A | 5/2013 |
| KR | 10-2020-0060847 A | 6/2020 |
| KR | 10-2020-0082163 A | 7/2020 |
| WO | 2014142759 A1 | 9/2014 |
| WO | 2018098441 A1 | 5/2018 |

OTHER PUBLICATIONS

Schumacher, Aug. 11, 2014 (Aug. 11, 2014), pp. 1-2, XP054979296, Retrieved from the Internet: URL:https://www.youtube.com/watch?v=dZ6YduxgsMA&feature=youtu.be&t=51 [retrieved on Apr. 11, 2019] (2 pages).

"Jump-N-Carry® Models 300, 400, 660, 950, 4000 & 12/24" Specification Sheet (8 pages).

http://www.a123systems.com/a123/products; A 123 Systems, Watertown, MA; 2010 (1 page).

http://www.omnicel.com/spec/er-18505-hd.pdf; OmniCel; Phoenixville, PA; 2010 (2 pages).

http://www.dowkokam.com/; Dow Kokam; Midland, MI (1 page).

NOCO GB70 BoostHD Jump Starter brochure (2 pages).

NOCO GB40 Boost Plus Jump Starter brochure (2 pages).

Rezervo RZ-300 Batteryless Jump Starter brochure (2 pages).

(56) References Cited

OTHER PUBLICATIONS

International Search Report and Written Opinion, mailed Nov. 23, 2015, in International application No. PCT/US2015/045335, filed Aug. 14, 2015 (12 pages).
International Preliminary Report on Patentability, issued Feb. 14, 2017, in International application No. PCT/US2015/045335, filed Aug. 14, 2015 (6 pages).
Supplemental European Search Report for Application No. EP 15 83 2596, dated Feb. 1, 2018 (10 pages).
Supplemental European Search Report for Application No. EP 15 83 1498, dated Mar. 15, 2018 (8 pages).
Communication in European Application No. EP 15 832 596.9, dated Feb. 5, 2019 (7 pages).
Communication in European Application No. EP 15 831 498.9, dated Apr. 18, 2019 (9 pages).
Examination report No. 1 for standard patent application in Australian Application No. 2018241089, dated Nov. 25, 2019 (3 pages).
Examination report No. 1 for standard patent application in Australian Application No. 2020201589, dated Nov. 5, 2020 (4 pages).
Int'l Preliminary Report on Patentability Appln No. PCT/US2021/055743 mailed May 4, 2023 (8 pages).
Int'l Search Report and Written Opinion Appln No. PCT/US2021/055743 mailed Feb. 8, 2022 (14pages).

* cited by examiner

600

700

BATTERY BOOSTER

CROSS-REFERENCE

The present application is a continuation of U.S. patent application Ser. No. 17/505,251, filed on Oct. 19, 2021, and titled Battery Booster, which claims the benefit under 35 U.S.C. § 119(e) of U.S. Provisional Patent Application No. 63/094,209, filed Oct. 20, 2020 and titled "Battery Booster With Removable Battery," U.S. Provisional Patent Application No. 63/126,637, filed Dec. 17, 2020 and titled "Battery Booster," and U.S. Provisional Patent Application No. 63/145,855, filed Feb. 4, 2021 and titled "Battery Booster," the contents of which are hereby incorporated by reference.

FIELD

The present disclosure relates to a portable battery booster system and apparatus. More specifically, the present disclosure relates to systems, methods, and apparatuses for providing an improved compact battery booster and/or charger. In some aspects, the present disclosure provides an improved compact battery booster and/or charger with a removable battery and/or improved boost protocols.

BACKGROUND

It is well known that motorists from time to time find themselves with a battery of insufficient charge to start their vehicle. This is generally an occasion of extreme inconvenience and distress, particularly where one finds himself in this situation in an area where there are other vehicles and drivers, but no means for connecting the battery of the disabled vehicle to the battery of one of the other available vehicles. Despite the advancements thus far, a need exists for an improved battery booster, and, more particularly, to an improved lithium battery booster capable of jump starting a vehicle using a removable battery, such as a power tool battery or other rechargeable lithium-ion battery (e.g., a standard 18650 battery). A need also exists for improved jump start safety protocols.

SUMMARY

The present disclosure is directed to a portable battery booster system and apparatus. More specifically, the present disclosure relates to systems, methods, and apparatuses for providing an improved compact battery booster and/or charger. In some aspects, the present disclosure provides an improved compact battery booster and/or charger with a removable battery and/or improved boost protocols.

DESCRIPTION OF THE DRAWINGS

These and other advantages of the present disclosure will be readily understood with reference to the following specifications and attached drawings wherein.

DESCRIPTION

Figure 1A:
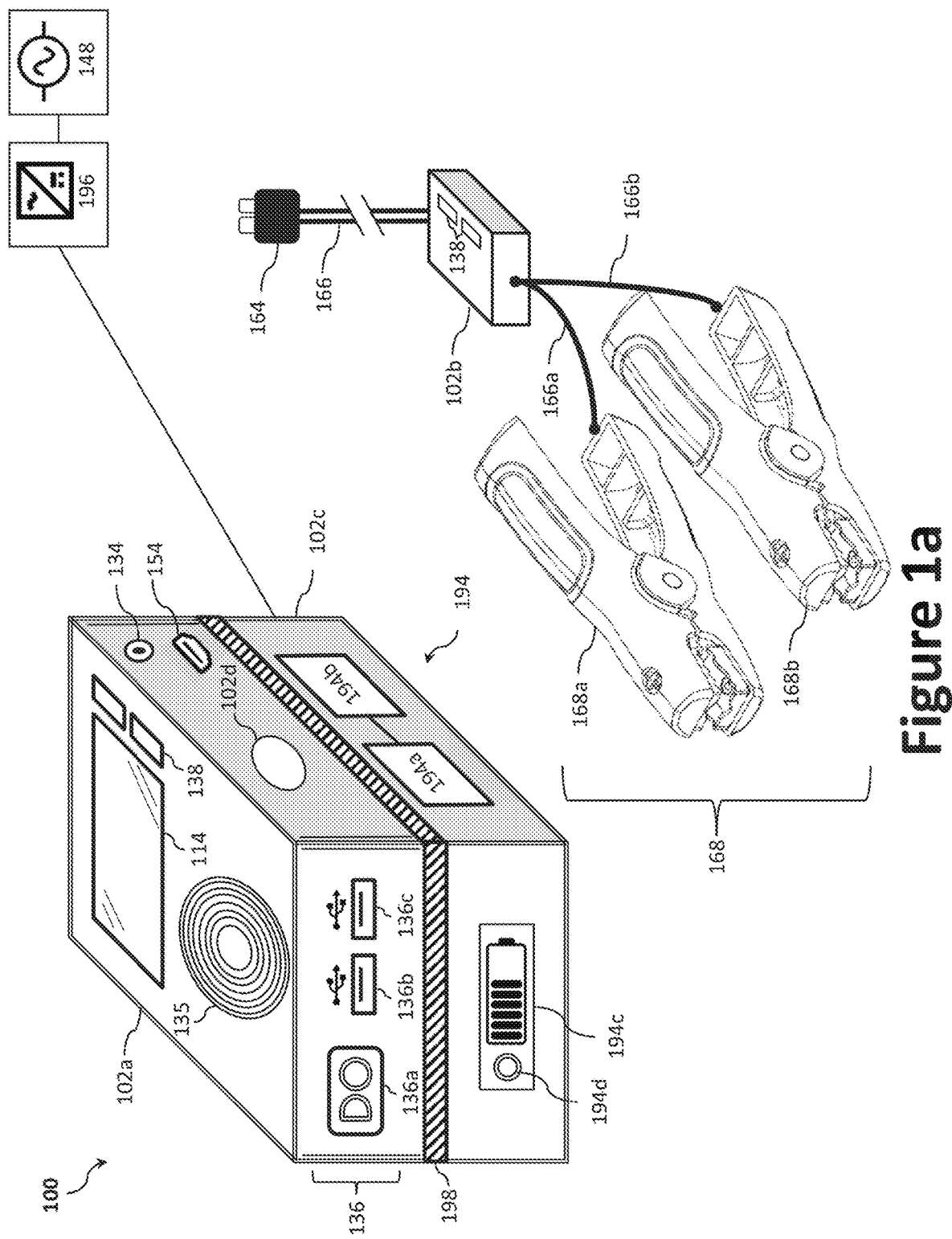
FIG. 1a illustrates a front perspective view of an exemplary battery booster.

Preferred embodiments of the present disclosure will be described herein below with reference to the accompanying drawings. In the following description, well-known functions or constructions are not described in detail because they may obscure the disclosure in unnecessary detail. The present disclosure relates to a battery booster system, method, and apparatus. For this disclosure, the following terms and definitions shall apply:

The term "exemplary" means "serving as an example, instance, or illustration." The examples described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

A battery booster, as disclosed herein, may be used to start (a/k/a "boost", "jump", or "jump-start") an engine operatively coupled to an external battery 104 (e.g., a 6V/12V/24V/48V nominal voltage vehicular battery or battery bank, which may be fully or partially depleted). In certain aspects, the battery booster may be further configured to charge the external battery, and/or other electronic devices operatively coupled with the battery booster. Example vehicular batteries include, without limitation, lead-acid batteries (e.g., wet/flooded batteries, silver-calcium batteries, Valve-Regulated, Lead Acid (VRLA) batteries, gel cell, and Absorbed Glass Mat (AGM)) and other rechargeable batteries (e.g., lithium ion, lithium ion polymer, Nickel-Metal Hydride (NiMH), Nickel Cadmium (NiCd)). Other electronic devices that may be operatively coupled with the battery booster include, for example, portable electronic devices (e.g., phones, tablet computers, portable computers, etc.), toys, etc.

FIG. 1a illustrates a front perspective view of an exemplary battery booster 100. The battery booster 100 may be, for example, a compact battery booster that is light weight and capable of hand-held use. While the battery booster 100 will primarily described as capable of hand-held use, the features and technology disclosed herein may be employed in other form factors, such as a cart-based unit, vehicle-mounted unit, etc. As illustrated, the battery booster 100 may generally comprise one or more housings 102 (e.g., a first housing 102a and a second housing 102b) having, inter alia, a display device 114, an AC input terminal 134, a user interface 138, a plurality of DC output terminals 136, and/or a DC input terminal 154. The first housing 102a may be the primary housing and the second housing 102b maybe be a secondary housing, such as an inline cable housing. The one or more housings 102 may be fabricated from, for example, plastic. In some examples, one or more housings 102 may include a magnet 102d to secure the battery booster 100 (or portion thereof) to a ferrous object, such as the vehicle 106 (e.g., the hood, engine bay, etc.). In certain aspects, the battery booster 100 may be fixedly or permanently mounted to the vehicle 106 via one or more mechanical fasteners.

The plurality of DC output terminals 136 may be used to charge (e.g., provide a charging current to external battery 104 or one or more portable electronic devices 152), boost (e.g., provide a boosting energy to a vehicle 106/external battery 104), or otherwise power external devices, including portable electronic devices 152, an external battery 104, an engine of a vehicle 106, etc. For example, the DC output terminals 136 may comprise a DC booster output 136a, a first DC accessory output 136b, a second DC accessory output 136c, etc. In certain aspects, one or more of the first DC accessory output 136b and the second DC accessory output 136c may be a USB Port, 12V port (e.g., a cigarette lighter socket), etc., a DC connector may be used for both DC input terminal 154 and DC output terminal 136.

While each of the components of the battery booster 100 can be provided in a single housing 102, in certain aspects, it may be advantageous to place certain components in a second housing 102b (e.g., serving as an auxiliary housing), thereby reducing the size of the first housing 102a (e.g., serving as a primary housing). For example, components that may be specific to jump starting an engine (as opposed to functions that may be used for other purposes, such as those for charging accessories, such as portable electronic devices 152) may be provided via the second housing 102b to reduce the size necessary for the first housing 102a. In some examples, the second housing 102b contains all components that may be specific to jump starting an engine and the circuitry positioned within the second housing 102b is connected directly to the positive terminal 158a and negative terminal 158b of the power bank 158 (i.e., without additional circuitry, switches, etc.).

The battery booster 100 can be removably coupled with a vehicle 106 or the external battery 104 (e.g., at its battery posts/terminals) of the vehicle 106 via a pair of electrical conductors 166 (e.g., positive and negative electrical conductors 166a, 166b), which can be electrically coupled with the battery booster 100 at one of the DC output terminals 136 (e.g., the DC booster output 136a). Each of the electrical conductors 166 may be, for example, a battery cable having a terminal connector at its distal end. The terminal connectors may be a set of battery clamps 168 (i.e., a positive clamp 168a and a negative clamp 168b), a set of ring connectors, a plug (e.g., a quick connect plug), etc. As illustrated, the second housing 102b (and associated components/circuitry) may be provided on one or both of the pair of electrical conductors 166 and positioned in line between the battery booster 100 (e.g., the detachable electrical ports/connectors 164) and the battery clamps 168. The battery clamps 168 may include a ratcheting feature to enable the battery clamps 168 to lock down onto the terminals of the external battery 104 or the vehicle 106. In one example, a processor 128a and the power-management circuit 132 (or portions thereof) may be provided via the second housing 102b. In certain aspects, rather than the above-described replaceable cables option, the detachable electrical ports/connectors 164 may be coupled, or integral with, the second housing 102*b* rather than via a length of electrical conductors 166.

In addition to conveying a charging current and/or boosting current to the external battery 104, the battery booster 100 can also measure, inter alia, the battery voltage of the external battery 104 and/or the current through the external battery 104 via the electrical conductors 166*a*, 166*b*. The electrical conductors 166*a*, 166*b* may employ, for example, battery clamps 168 capable of Kelvin sensing (four terminal sensing). Kelvin sensing is an electrical impedance measuring technique that uses two separate pairs of current-carrying and voltage-sensing electrodes per conductor 166*a*, 166*b* to provide more accurate measurements than two-terminal (2T) sensing. To that end, each of the electrical conductors 166*a*, 166*b* may employ multiple electrically isolated electrodes (i.e., cables, conductors, wires, etc.), whether sharing an insulated outer casing or otherwise bundled. By way of illustration, each of the electrical conductors 166*a*, 166*b* may employ two electrodes and provide two battery contacts (e.g., via battery clamps 168 or ring terminals capable of Kelvin sensing).

The proximal end of the electrical conductors 166*a*, 166*b* may be removably coupled with the battery booster 100 at the DC booster output 136*a* via, for example, one or more detachable electrical ports/connectors 164 (e.g., EC5 connectors, barrel connectors, pin connectors, magnetic connectors, etc.). In another example, the proximal end of the electrical conductors 166*a*, 166*b* may be fixedly coupled (i.e., non-removably coupled, for example, soldered) with the battery booster 100. One or both of the housings 102*a*, 102*b* of the battery booster 100 may further include one or more cable wrapping posts or another structure around which various cords may be wrapped, secured, or retracted.

Figure 1B:
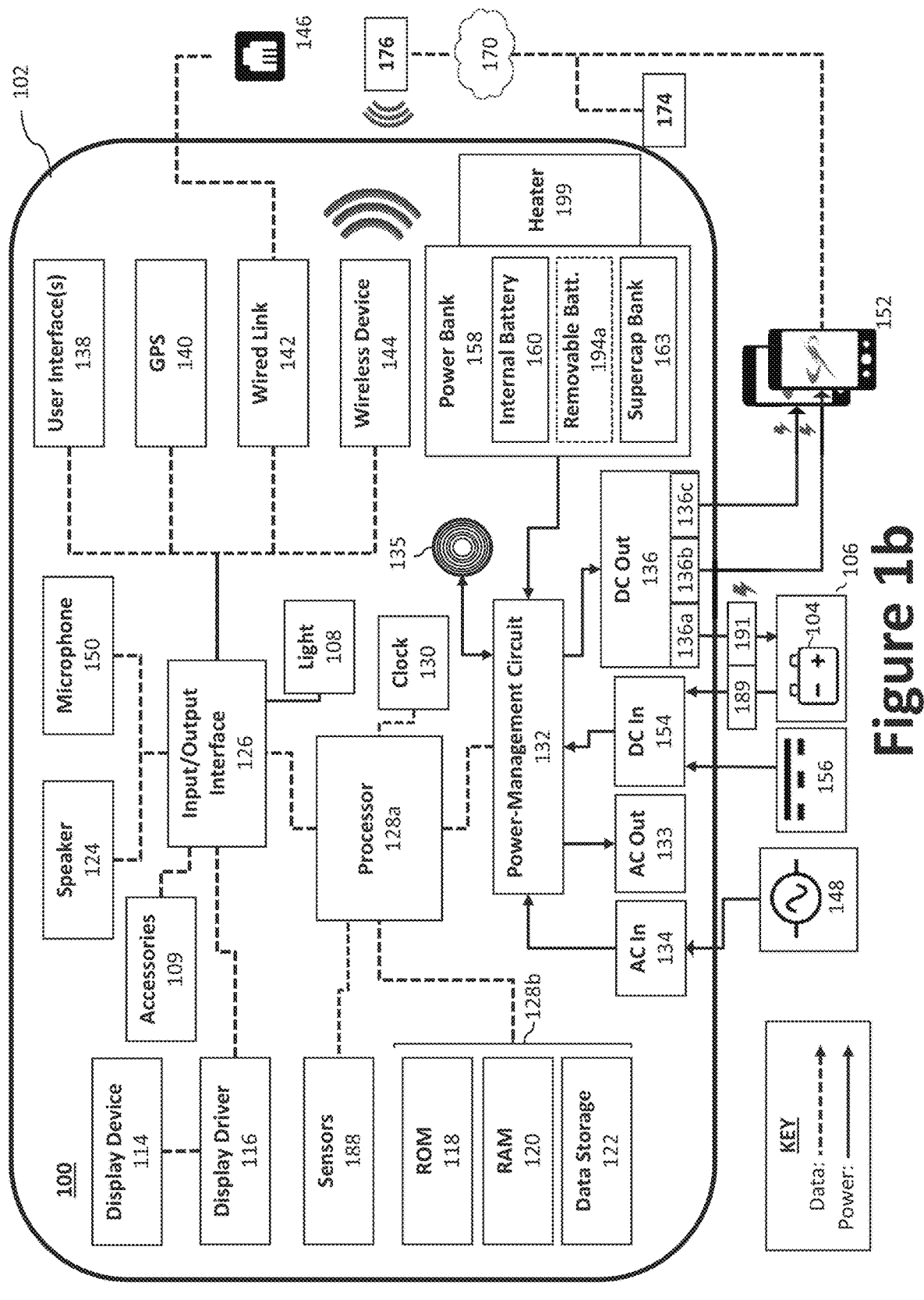
FIG. 1b illustrates a block diagram of an example battery booster.

FIG. 1*b* illustrates a block diagram of an example battery booster 100. The battery booster 100 may comprise one or more processors 128*a* (e.g., a microprocessor, a central processing unit (CPU), etc.) to control the various operations of the battery booster 100 (e.g., to monitor and/or selectively charge or boost external devices). The one or more processors 128*a* may be operatively coupled to one or more memory devices 128*b*, such as a read-only memory (ROM) 118 for receiving one or more instruction sets, a random access memory (RAM) 120 having a plurality of buffers for temporarily storing and retrieving information, and to an internal data storage device 122 (e.g., a hard drive, such a solid state drive, or other non-volatile data storage device, such as flash memory). A clock 130 is also coupled to the processor 128*a* for providing clock or timing signals or pulses thereto. Those skilled in the art will understand that the battery booster 100 includes one or more bus structures for interconnecting its various components. In certain aspects, the battery booster 100 may employ one or more communication protocols and interfaces, such as Controller Area Network (CAN bus), PC, Serial Peripheral Interface (SPI), etc.

The one or more processors 128*a* may be configured to operate in a low power mode. For example, when in a sleep mode, the one or more processors 128*a* may be configured to operate the battery booster 100 in a low power mode where it is responsive to user input, but non-essential components are disabled to conserve power until the battery booster 100 is reactivated by a user input. Examples of non-essential components include, for example, display device 114, display driver 116, light 108, GPS transmitter 140, communication (e.g., via wired link 142 and wireless device 144), accessories 109, speakers, etc.

For purposes of illustration, the various components of the battery booster 100 are illustrated as being contained within a single housing 102. Indeed, to increase ease of use in mobile applications, the various components of a battery booster 100 may be housed in a single housing 102. As noted above, however, it is contemplated that certain components or functionality may be provided via a second housing. Further, while a single component may be illustrated, the described functionality may be distributed across multiple components. For example, while a single processor 128*a* is illustrated, a plurality of processors 128*a* may be used to operate the battery booster 100; whether in the same housing or separate housings (e.g., housings 102*a*, 102*b*). Accordingly, serial communication may be employed to communicate information and data between multiple processors 128*a* that may be used.

The power bank 158 may be used to charge the portable electronic devices 152, charge the external battery 104, jump start the engine of the vehicle 106 associated with the external battery 104, and/or power the components of the battery booster 100 (e.g., when disconnected from a DC power supply 156 and/or an AC power supply 148). The power bank 158 may comprise one or more lithium batteries (e.g., an internal battery 160 and/or one or more removable batteries 194*a*) and one or more internal supercapacitors 162. The supercapacitor 162, also called an ultracapacitor, is a high-capacity capacitor with a capacitance value that much higher than other capacitors (e.g., 10 to 100 times more energy per unit volume or mass than electrolytic capacitors). For example, the one or more internal batteries 160 and/or one or more supercapacitors 162 may be electrically coupled in parallel, series, or a combination thereof, where switches are used to selectively charge and/or discharge power thereto or therefrom. For example, two or more supercapacitors 162 may be electrically coupled to one another to form a supercapacitor bank 163. The supercapacitor bank 163 may be reconfigurable according to different vehicle battery voltages, such 6V/12V/24V/48V vehicles.

As will be described, the various switches may be mechanical switches (e.g., relays) or solid-state switches (e.g., transistors, such as a metal-oxide-semiconductor field-effect transistor (MOSFET), silicon controlled rectifiers (SCRs), etc.). The power bank 158 should be sufficiently rated to boost (jump start) a vehicle 106 coupled to an external battery 104. The internal battery 160 may be rated at least 3,000 mAh, more preferably at least 10,000 mAh. A battery booster 100 having a 12,000 mAh internal battery 160, for instance, may output 200 cranking amps/400 peak amps during the jump-start function, which is sufficient to start a vehicle 106, but higher power internal batteries are contemplated for larger vehicles and trucks. In another example, the battery booster 100 may have a 32,000 mAh internal battery 160, for instance, may output 500 cranking amps/1,000 peak amps during the jump-start function. In certain examples, the internal battery 160 may comprise a plurality of electrically coupled battery cells connected to define a positive terminal and a negative terminal. For example, the battery cells can be connected in parallel, or when multiple lower voltage batteries are to be summed, in series.

In some scenarios, a user may wish to replace a battery that is discharged, defective, or otherwise deficient with a battery that is fully charged, heathy, etc. For example, a user may have spare rechargeable batteries that are charged and otherwise not being used, such as power tool batteries. To that end, the power bank 158 may be electrically coupled with a removable battery 194*a* via, for example, an interface 198. The removable battery 194*a* may serve to supplement or obviate the need for the internal battery 160. For example, the removable battery 194*a* may be electrically connected to the power bank 158 when the internal battery 160 and/or supercapacitor bank 163 are depleted and the user is unable to recharge them via the power-management circuit 132 (e.g., due to time constraints or availability of an external power supply).

The removable battery 194*a* may be provided as a removable internal battery within the same housing 102 or as a removable battery pack 194 with a separate battery pack housing 102*c*. For example, the removable battery pack 194 can be configured to couple to the housing 102*a* via the interface 198. The removable battery pack 194 may comprise, for example, the removable battery 194*a*, battery pack control circuitry 194*b* (e.g., a battery management system (BMS)), and/or a battery status indicator 194*c* to display a state of charge of the removable battery 194*a* (e.g., using icons, symbols, or alphanumeric characters). The battery status indicator 194*c* may be, for example, light emitting diodes (LEDs), liquid crystal displays (LCDs), etc.

The interface 198 may include electrical contacts (e.g., tabs, plugs, plates, pogo pins, etc.) to transfer power between the removable battery 194*a* and the power-management circuit 132. The interface 198 may further include mechanical attachments to secure the battery pack housing 102*c* to the housing 102*a* (e.g., via snaps, clips, tracks, etc.). For example, the battery pack housing 102*c* may slide into and lock to the interface 198. In some examples, an adapter may be used to enable the interface 198 to couple with battery pack housings 102*c* from various manufacturers, thereby enabling cross-platform usage. The removable battery pack 194 may be charged via the power-management circuit 132 (e.g., when electrically coupled to the interface 198) or via a charger 196 can be removable coupled to an AC power supply 148 and the removable battery pack 194. For example, once the vehicle 106 is started, power from its alternator can be used to recharge the removable battery pack 194 via the power-management circuit 132. While the charger 196 is illustrated as a separate, external charger (e.g., a wall charger with an AC/DC converter), the charger 196 (or functionality thereof) may be integrated with the power-management circuit 132.

The interface 198 may also be configured to transfer data between the power-management circuit 132 and the battery pack control circuitry 194*b* via the electrical contacts. For example, the battery pack control circuitry 194*b* may employ software that controls charging and discharging of the removable battery 194*a*. In certain aspects, the battery pack control circuitry 194*b* may employ authentication software to authenticate the battery booster 100 and/or the charger 196 (or vice versa).

The internal battery 160 and removable battery 194*a* may each be a rechargeable lithium battery for outputting a direct current (DC) voltage. Example lithium battery chemistries include lithium iron phosphate (LiFePO$_4$), lithium polymer (Li-poly), lithium-cobalt oxide (LiCoO$_2$), lithium-titanate, lithium-nickel manganese cobalt oxide (LiNiMnCoO$_2$ or NMC), lithium iron magnesium phosphate (LiFeMgPO$_4$), lithium-manganese oxide (LiMnO$_2$), lithium ion manganese oxide (LiMn$_2$O$_4$, Li$_2$MnO$_3$, or LMO), etc. Other metal battery chemistries are possible, for example, aluminum-ion batteries. The internal battery 160 and the removable battery 194*a* need not be limited to a single battery or single battery cell. For example, lithium iron phosphate batteries typically have a nominal cell voltage of about 3.2V to 3.3V each, while lithium-titanate batteries have a nominal cell voltage of about 2.4 V. Accordingly, multiple lithium cells may be connected in series to achieve a desired nominal voltage for the internal battery 160 or the removable battery 194*a*. For example, where the nominal cell voltage is 3.2V to 3.3V, four cells may be connected to achieve a nominal voltage 12.8V to 13.2V.

Additional lithium cells may be connected in series to achieve a higher nominal voltage where desired. In fact, the nominal voltage of the internal battery 160 may be selected a function of the nominal voltage of the external battery 104. In certain aspects, the nominal voltage of the internal battery 160 may be matched to (e.g., about the same as) the nominal voltage of the intended external battery 104. For example, if the nominal voltage of the intended external battery 104 is 12 volts, the nominal voltage of the internal battery 160 may be set to around 12 volts. In one example, the internal battery 160 may comprise four battery cells connected in series, each having in a nominal cell voltage of about 3.2V to 3.3V (totaling 12.8V to 13.2V).

The nominal voltages of the internal battery 160 and the removable battery 194*a* need not be matched (or similar) to the external battery 104. In fact, it can be advantageous to select a nominal voltage for the internal battery 160 that is greater than or otherwise exceeds the nominal voltage of the external battery 104 (e.g., by 15% to 50%, or at least 30%). One advantage of setting the voltage of the internal battery 160 higher than the intended external battery 104 is the reduction in current requirements for the internal battery 160 during a jump start. That is, a battery with a higher nominal voltage can output a larger amount of power at a given current than a battery with a lower voltage at the same current. Another advantage is that the voltage of the internal battery 160 need not be monitored for a low battery condition. In some cases, fully depleting a lithium cell can damage the battery. Therefore, the voltage of the internal battery 160 is traditionally monitored to ensure that the internal battery 160 is not fully discharged. By employing a nominal voltage for the internal battery 160 that is greater than or otherwise exceeds the nominal voltage of the external battery 104, such monitoring is not necessary and the battery feedback circuitry and switching can be omitted, thereby decreasing cost. To that end, in some examples, the processor 128*a* may proceed to jump start a vehicle 106 (i.e., close the boost switch 191; subject to other safety checks, such as reverse polarity, temperature, etc.) regardless of a charge status of the internal battery 160 (e.g., depleted charge status). The processor 128*a* may, however, still monitor the charge status of the internal battery 160 for purposes of displaying a state of charge, polarity status, etc.

In one example, power tool batteries may be used as the removable battery 194*a*. The nominal voltage of power tool batteries varies from manufacturer to manufacture, but are often greater than 12-volts. For example, common nominal voltages for power tool batteries include 18 volts and 20 volts. In another example, the nominal voltages of the internal battery 160 and/or the removable battery 194*a* may be higher voltage batteries (e.g., 60V, 80V, etc.), such as those used in lawn and garden type applications. In one example, where the nominal voltage of the intended external battery 104 is 12 volts, the nominal voltage of the internal battery 160 may be set to around 16 volts.

When charged by the external battery 104 (or vehicle 106) having a lower nominal voltage, the power converter 184 may be used to step up the voltage to a charging voltage. For example, a boost converter may be used to charge a 16-volt battery from a 12-volt battery (or 12-volt generator/alternator). Where an internal battery 160 with a nominal voltage of 16 volts is desired, the internal battery 160 may comprise five battery cells connected in series, each having in a nominal cell voltage of about 3.2V to 3.3V. In this example, the nominal voltage of the internal battery 160 may be 33.34% higher than the nominal voltage of the external battery 104. However, the nominal voltage of the internal battery 160 may be greater than the nominal voltage of the external battery 104 by a different percentage, including for example, 10 to 50%, more preferably 20 to 40%. The nominal voltage of the removable battery 194a may be dictated by the available power tool voltage platforms.

In another example, the nominal voltage of the intended external battery 104 is 24 volts, while the nominal voltage of the internal battery 160 may be set to around 32 volts. In yet another example, the nominal voltage of the intended external battery 104 is 48 volts, while the nominal voltage of the internal battery 160 may be set to around 64 volts. An increased nominal voltage enables the internal battery 160 to expend additional power without dropping below a voltage (or power) necessary to jump start a vehicle 106. For example, the excess power afforded by the internal battery 160 may be used to pre-charge the external battery 104 and/or preheat the external battery 104 or internal battery 160, thereby making it easier to jump start the vehicle 106. As will be discussed, pre-charging the external battery 104 can increase efficiency of the battery booster 100. In some examples, an internal heater 199 may be provided to preheat the power bank 158, which may be particularly advantageous to the batteries (e.g., the internal batteries 160 and/or removable battery 194a) in cold weather.

A supercapacitor bank 163 may be used (whether alone or in addition to the internal battery 160 and/or removable battery 194a) to supply a large amount of power that is sufficient time to jump start a vehicle 106. A single supercapacitor 162 may be used or a supercapacitor bank 163 composed of a plurality of supercapacitors 162 may be used. For example, a plurality of supercapacitors may be coupled in parallel to aggregate the individual capacitors' capacitances. Supercapacitors 162 are useful in that, unlike batteries, they do not necessarily suffer from ageing and temperature problems. In general, a supercapacitor 162 can hold a very high charge that can be released relatively quickly, thereby making it suitable for jump starting a vehicle 106, since the vehicle 106 cranking operation lasts for a very short period of time during which high cranking power is required. Moreover, supercapacitors 162 are relatively small in size and can be employed in the battery booster 100 to provide sufficient cranking power to jump start a vehicle 106. In certain aspects, power from the supercapacitor bank 163 may be used to power the battery booster 100 to conserve power in the internal battery 160 and/or an internal removable battery 194a. For example, in sleep mode, the supercapacitor bank 163 may be used to power the battery booster 100. Another benefit of supercapacitors is that they can be charged more quickly than a battery, thus they can be used to jump a vehicle within a few minutes, whereas a booster with a discharged internal battery can take hours to recharge before it could start a vehicle.

To charge the power bank 158 (or components thereof), the battery booster 100 may receive external power via a direct current (DC) input terminal 154 coupled to a DC power supply 156 and/or an alternating current (AC) input terminal 134 coupled to an AC power supply 148. AC power supply 148 may be wall current (e.g., 120 VAC), while the DC power supply 156 may be, for example, an automotive cigarette lighter (e.g., 12 VDC), a USB port (i.e., 5 VDC), etc. In certain aspects, one of the plurality of DC output terminals 136 may serve as both a DC input terminal 154 and a DC output terminal 136. That is, the battery booster 100 may draw power from a device coupled to the DC output terminals 136 (functioning as a DC input terminal 154), or supply power to the device coupled to the DC output terminals 136 (functioning as a DC output terminal 136). For example, the battery booster 100 may draw a charging current to charge the power bank 158 from a vehicle 106 alternator via the DC booster output 136a (through the set of battery clamps 168, for example). In another example, the battery booster 100 may draw a charging current to charge the power bank 158 from a power source coupled to the first DC accessory output 136b, the second DC accessory output 136c, etc.

To convert the AC power supply 148, an AC-to-DC transformer may be provided, which may be integral with, or external to, the battery booster 100. An AC-to-DC transformer may removably coupled with wall current (i.e., line current) and/or removably coupled to the battery booster 100. In certain aspects, a power inverter and AC output terminal may be provided to output an AC voltage (e.g., a 120 VAC output) via AC output terminal 133. In such an example, power from the DC power supply 156 or the power bank 158 may be processed (e.g., using a DC-to-AC inverter) and used to supply the AC voltage to the AC output terminal.

In operation, when the AC power supply 148 or DC power supply 156 is unavailable (e.g., disconnected, out of service, when a circuit breaker is blown, the battery booster 100 is otherwise disconnected, etc.), the battery booster 100 may draw the power needed to operate the components of the battery booster 100 from the external battery 104, the removable battery 194a, and/or power bank 158, thereby enabling the user to determine the status of the battery booster 100 (and state of charge, or other parameters, of the external battery 104) when the AC power supply 148 and the DC power supply 156 are unavailable. To that end, the battery booster 100 may report a power supply failure (e.g., as an alert) to one or more portable electronic devices 152 (e.g., phones, tablet computers, portable computers, or other handheld terminals) within a battery monitoring network via a communication network 170.

The battery booster 100 may further include an input/output interface 126 that interfaces the processor 128a with one or more peripheral and/or communicative devices, such as a user interface 138, a Global Positioning System (GPS) transmitter 140, a wired link 142, a wireless device 144, a microphone 150, and a speaker 124, which may be used to signal an alert (e.g., charge complete, error, etc.) or other status information. As illustrated, the processor 128a may be operatively coupled to a display device 114 via a display driver 116.

The display device 114 may comprise, or otherwise employ, one or more light emitting diodes (LEDs), a liquid crystal display (LCD) screen, an organic light-emitting diode (OLED or organic LED) screen, and/or electronic ink (E-ink) displays. The LCD/OLED screen may be an alphanumeric segmented display, or a matrix display, such as those used on portable electronic devices. In certain examples, the LCD/OLED screen may further provide touch screen functionality to facilitate user input device via a thin layer of sensing circuitry present either beneath the visible portion of a surface of the display device 114, or as part of a thin, clear membrane overlying the display device 114 that is sensitive to the position of a pen or finger on its surface.

In certain aspects, the battery booster 100 may employ multiple display devices 114. For example, a first display device 114 may be provided on the first housing 102a, while a second display device 114 may be provided on the second housing 102b. The first and second display devices 114 provide redundant information and/or function-specific information. For example, when the second housing 102b houses components of the battery booster 100 that are specific to a jump-start function, the second display device may be specific to the jump-start function.

In operation, the display driver 116 may receive display data from the processor 128a via input/output interface 126 and display the display data via the display device 114. For example, interactive display device 114 may be provided on the housing to provide the user with status information and/or input capability (e.g., via a touch screen or voice commands using, for example, wave files). Reminders, or other information (e.g., status information), may be displayed to the user, via the display device 114, as a scrolling message or menu structure (e.g., a graphical user interface (GUI)).

With regard to the internal data storage device 122, example flash memory devices include, for example, memory cards, such as RS-MMC, miniSD, microSD, etc. The internal data storage device 122 can function as an external hard drive or flash drive, thereby enabling the user to store digital files to the battery booster 100. In instances where the internal data storage device 122 is removable, as is the case with memory cards, the user can interchange, upgrade, or remove the memory card (e.g., if the battery booster 100 becomes defective) to avoid data loss. The display device 114 may be used to display, for example, the contents of the internal data storage device 122, the remaining storage capacity (e.g., as a percentage or in terms of available bytes), and, in certain aspects, the digital files themselves (e.g., photos may be displayed, files accessed, etc.). In certain aspects, in addition to (or in lieu of) charging a portable electronic device (e.g., a smart phone), the battery booster 100 may back up digital content stored to the portable electronic device 152 when the portable electronic device 152 is coupled to the battery booster 100 via, for example, a DC output terminal 136 that is a USB port. In some examples, the battery booster 100 may be configured to boot loading the software to the processor 128a from the internal data storage device 122, the wired link 142, the wireless device 144, and/or a USB port (e.g., first DC accessory output 136b, the second DC accessory output 136c, etc.).

When an external battery 104 is connected to the DC booster output 136a (e.g., via a set of battery clamps 168), the display device 114 may display the voltage of the external battery 104. The display device 114 may also indicate the state of charge of the external battery 104 in terms of percent of charge of the internal battery 160. During user inactivity, such as when charging the external battery 104, the internal battery 160, or the removable battery 194a, the display device 114 may enter a sleep mode and will not display any messages until activity is detected (e.g., when devices are connected/disconnected from the battery booster 100 or the user interface 138 is actuated). A sleep mode may be trigged when there is no user interaction for a period of time (e.g., no commands or button presses for at least 30 minutes).

As discussed below, if the voltage of the external battery 104 voltage is too low to detect across the DC booster output 136a, the display device 114 may remain blank and the voltage will not display, but a manual start procedure may be selected to enable the jump-start function (i.e., an override). The jump-start function may be used to start a vehicle 106 having an external battery 104 (e.g., a depleted automotive battery). The jump-start function causes the battery booster 100 to output a boosting current (e.g., 400+ peak amperes/ 200+ cranking amperes) via clamps coupled to the DC output terminal 136. One of skill in the art, however, would recognize that the internal battery 160 may be replaced with a higher capacity battery to facilitate higher output currents. Similarly, the supercapacitor bank 163 may be discharged into the external battery 104 (e.g., together with the internal battery 160 and/or the removable battery 194a).

In one example, once an AC power supply 148 (or DC power supply 156) is connected, a first LED of the display device 114 may be illuminated to indicate that the internal battery 160 of the battery booster 100 is charging. When the battery booster 100 is fully charged, a second LED on the unit may be illuminated. Finally, when the DC output terminal 136 is properly coupled to external battery 104 (e.g., clamped or otherwise electrically coupled), a third LED may be illuminated. Rather than employing separate LEDs, an LCD/OLED display or a single multi-color LED may be employed that changes color depending on the status of the battery booster 100. The battery booster 100 may be further equipped with a light 108, which may function as a map light, flashlight, work light, emergency light, SOS, etc. The light 108 may be activated and deactivated via user interface 138, such as a button, switch, etc. The light 108 may be an LED that outputs, for example, 15 to 1,000 lumens. In certain aspects, the light 108 may serve a dual function and also act as an indicator. For example, the light 108 may be a flashlight/task light that is configured to flash when the battery booster 100 is ready to jumpstart. The battery booster 100 may be further equipped with other accessories 109, such as an air compressor.

When an LCD/OLED screen is employed as the display device 114, the display device 114 may be configured to display, in addition to, or in lieu of, the LEDs, a number of messages to indicate the current status, or operation of the battery booster 100 to the user. In selecting the message(s) to display, the battery booster 100 measures one or more parameters of the internal battery 160, external battery 104, or of the battery booster 100. Parameters include, for example, voltage, power capacity, temperature, connection status, state of heath (SOH) for the external battery 104, etc. To avoid interference from the battery booster 100, the voltage of the external battery 104 can be measured prior to electrically connecting the vehicle 106 to the power bank 158 via the boost switch 191.

The user interface 138 may be used to enable the user to switch the output charge amperage (e.g., 1 A, 10 A, 50 A, 100 A, etc.) or another setting (e.g., charge, boost, other). Example user interface 138 devices may include, for example, physical buttons, physical switches, a digitizer (whether a touch pad, or transparent layer overlaying the display device 114), voice command (e.g., via the microphone 150 and speaker 124), and other input devices. For instance, using the digitizer, a user may control or interact with the battery booster 100 by writing or tapping on the display device 114 using, a pen, stylus, or finger. In certain aspects, as will be described below, the user interface 138, or a portion thereof, may be remotely situated and coupled to the battery booster 100 over a communication network 170 (e.g., as part of a portable electronic device 152, such as a mobile application).

The wireless device 144 may be configured to manage communication and/or transmission of signals or data between the processor 128*a* and another device (e.g., the portable electronic device 152 via a communication network 170 or directly with a portable electronic device 152) by way of a wireless transceiver. Using a wireless device 144, a user may be able to start and/or stop the charge cycle of the battery booster 100 or otherwise change the settings. The wireless device 144 may be a wireless transceiver configured to communicate via one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers (IEEE) 802.11 standards), etc. For example, wireless connectivity (e.g., RF 900 MHz or Wi-Fi) may be integrated with the battery booster 100 to provide remote monitoring and control of the battery booster 100 via one or more portable electronic devices 152. In some examples, such as where bandwidth is limited, a publish-subscribe network protocol may be used to transport messages between the battery booster 100 and another device, such as the message queuing telemetry transport (MQTT). The MQTT can run over TCP/IP; however, any network protocol that provides ordered, lossless, bi-directional connections can support MQTT.

The GPS transmitter 140 and/or wireless device 144 may be used to track and/or monitor the location of the battery booster 100 and to relay the location information in the form of positional data (e.g., geographic coordinate system data or Internet Protocol (IP) address) to a booster management server or another device in battery charging system or via a communication network 170. For example, a computer may be configured to track the activities, location, and/or charge history of a particular battery booster 100 in a battery charging system. The positional data may also be locally stored to the battery booster 100 (e.g., to internal data storage device 122).

In certain aspects, a wired link 142 may be provided to manage communication and/or transmission of signals or data between the processor 128*a* and another device via, for example, a data port 146 (e.g., RS-232, USB, and/or Ethernet ports) capable of being wiredly coupled with another data port 146 positioned outside the battery booster 100 housing. As noted above, a USB port or 12V supply may be provided as DC output terminals 136 on the charger to facilitate the charging of accessories, such as portable electronic devices 152. Thus, the internal battery 160 of the battery booster 100 may also be used as a power source for one or more DC accessories. Charging while operating the accessories can extend run time of the battery booster 100, but will also extend recharge time. If the load exceeds the charging input amperage (e.g., 1A), however, the accessory being charged may discharge the internal battery 160.

The DC accessory output port (e.g., first DC accessory output 136*b*, the second DC accessory output 136*c*) may be a USB port that may provide, for example, 5 VDC at one or more amperages, including for example, 1.0 A, 2.1 A, 3.0 A, etc. To activate a DC accessory output port, a power button (or other user selectable element) may be provided via user interface 138. The DC accessory output port may be activated by pressing the power button, and disabled by, for example, pressing the power button a second time, two or more times in quick succession, or held for a predetermined period of time. In other aspects, the DC accessory output port may be a 12 VDC power supply configured to output, for example, up to 12 VDC at 6.0 A.

The battery booster 100 may further comprise a plurality of sensors to provide measurement data descriptive of the surrounding environment. In certain aspects, the DC accessory output port may automatically shut off when no load is detected (e.g., after 5-10 minutes of a no load state). The DC booster output 136*a*, however, may remain active until the battery booster 100 reaches a low battery state (e.g., the charge level of the internal battery 160 is less than a predetermined threshold and the supercapacitor bank 163 cannot provide any additional power). The DC accessory output port may provide a nominal voltage to match the external battery 104 (e.g., 12 VDC) and used to supply power to an integrated or remotely situated air compressor (e.g., for tire inflation). Matching (or exceeding) the nominal voltage of the external battery 104 may further enable the DC accessory output port or DC booster output 136*a* to function as a memory saver to the vehicle 106 (e.g., via an on-board diagnostics (OBD) port, cigarette lighter, etc.), thereby obviating the need to reprogram the vehicle 106 when the external battery 104 is disconnected or removed. In certain aspects (e.g., in a 12-volt automotive system), the DC accessory output port may be limited to 12 VDC at 6.0 A with over current protection. In certain aspects, a user may wish to check the status of the power bank 158, such as the charge status/level of the internal battery 160, the removable battery 194*a*, or the supercapacitor bank 163. To do so, a button (or other user selectable element) may be provided via user interface 138 that causes the status(es) to be displayed on the display device 114. A similar button 194*d* may be provided on the battery pack housing 102*c* of the removable battery pack 194 to control or activate the battery status indicator 194*c*. To ensure accuracy of the measurement, the user may be instructed (e.g., via display device 114) to disconnect or turn off the battery booster 100 before actuating the button (or displaying the charge level). In one aspect, the display device 114 can show the percent of charge (or an icon indicating the same) for one or more of the internal battery 160, the removable battery 194*a*, and/or the supercapacitor bank 163. For example, the display device 114 may display "100%" (or a solid battery icon) when the internal battery 160 and/or the removable battery 194*a* is fully charged.

The battery booster 100 may include sensors 188 (e.g., a temperature sensor, humidity sensor, voltage sensor, current sensor, etc.), configured to monitor itself or other appliances or devices, either directly (e.g., using sensors 188) or wirelessly (e.g., using Wi-Fi). The processor 128*a* may be configured to monitor, via one or more sensors 188 (whether local or remotely located), a temperature of the internal battery 160, the removable battery 194*a*, or the external battery 104. In another example, the battery booster 100 may be configured to charge and monitor, in addition to automotive batteries, one or more portable electronic devices 152 being charged by said battery booster 100. The battery booster 100 may then charge or boost the external battery 104 as a function of the temperature or humidity of the environment or of the battery booster 100. For example, as will be disclosed the battery booster 100 may be used to pre-charge and/or pre-heat the external battery 104, the internal battery 160, and/or the removable battery 194*a* in cold weather. Another temperature sensor may be provided to measure the temperature of the internal battery 160, the external battery 104, the removable battery 194*a*, or another battery being charged (e.g., a lithium-ion battery of a portable electronic devices 152). If the measured temperature deviates from an operating range (i.e., a range in which the measured value is acceptable), the charging or boosting operation may be prohibited.

Figure 1C:
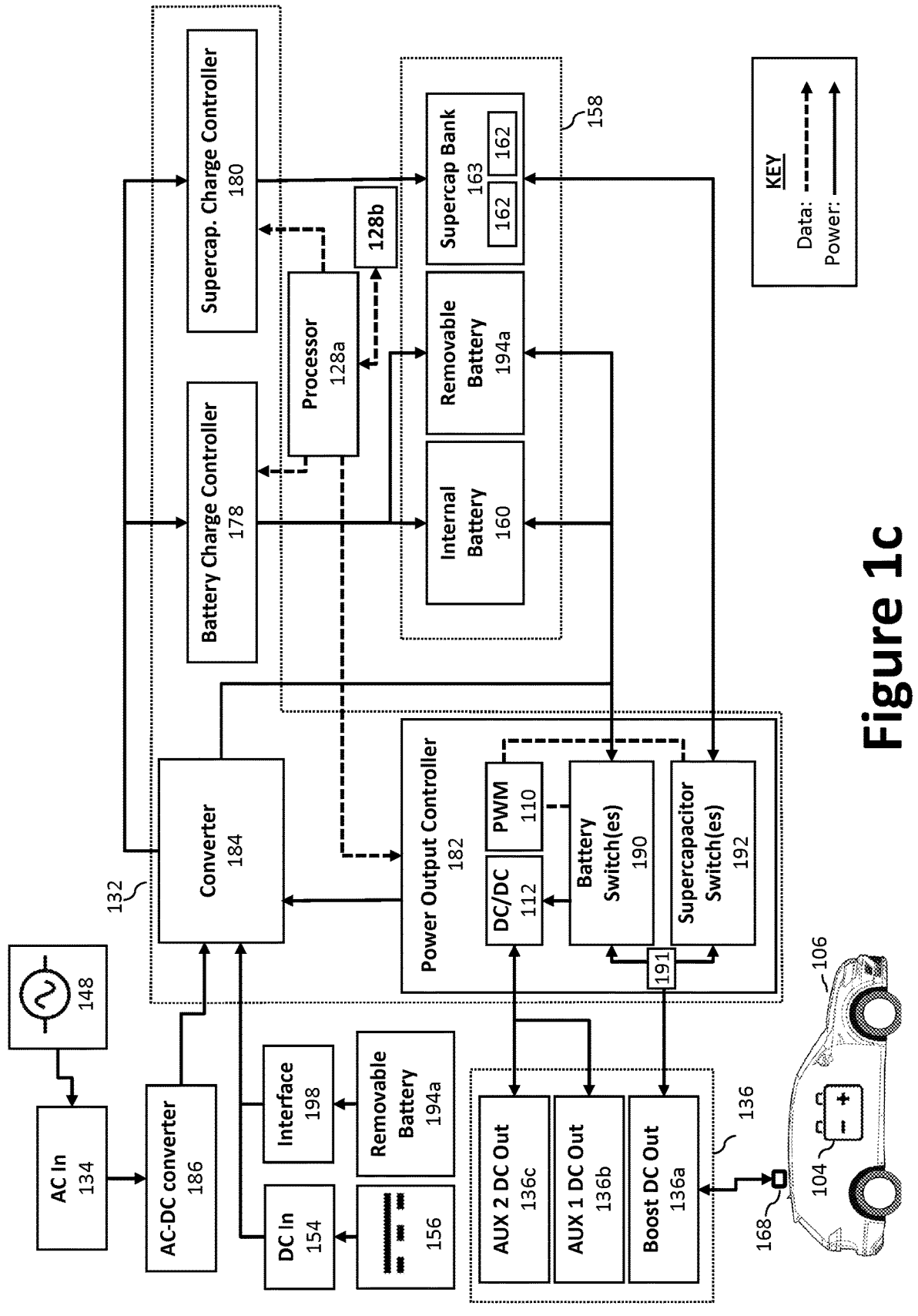
FIG. 1c illustrates a schematic diagram of an example battery booster.

With reference to FIG. 1c illustrates a schematic diagram of an example battery booster 100. As illustrated, a power-management circuit 132 may be used to manage power needed to operate the battery booster 100 (and components thereof), start an engine, and to charge the external battery 104, portable electronic devices 152, or other device via a DC output terminals 136. The power-management circuit 132 may comprise a battery charge controller 178, a super-capacitor charge controller 180, power output controller 182, and a power converter 184. In certain aspects, the power converter 184 may be coupled to the DC input terminal 154 or the AC input terminal 134 (e.g., via an AC-to-DC converter 186) and used to charge the power bank 158 (e.g., via the battery charge controller 178 and the supercapacitor charge controller 180). In some examples, the AC-to-DC converter 186 may charge power bank 158 (e.g., internal battery 160, removable battery 194a, and/or supercapacitor bank 163), and or external battery 104 directly.

The power converter 184 may employ one or more of a buck converter, a boost converter, a buck boost converter, and/or a single-ended primary-inductor converter (SEPIC) circuit. A SEPIC circuit is a form of DC-to-DC converter that allows the electrical potential (voltage) at the output of the SEPIC circuit to be greater than, less than, or equal to that at its input. The output of a SEPIC circuit is controlled by the duty cycle of a control transistor. In other words, a SEPIC circuit exchanges energy between capacitors and inductors in order to convert a variable input voltage (e.g., from the DC input terminal 154 or the AC-to-DC converter 186) to a predetermined output voltage that can be used to charge the power bank 158, for example. The amount of energy exchanged is controlled by a switch, which may be a transistor such as a MOSFET. As a result, a SEPIC circuit enables a wide variation in input voltage both substantially higher and lower than the charge voltage of the power bank 158. For example, to charge a battery with a nominal voltage of 12 volts to 14.4V, the variable input voltage can be a voltage from a predetermined range, such as between 5 VDC to 20 VDC, thereby enabling internal battery 160 recharging functionality via a USB port, which is typically 5 VDC, but other voltages are contemplated, such as 7 VDC. That is, the input voltage may not be always known, but the predetermined range may be known. In certain aspects, the SEPIC circuit may be shut off (e.g., bypassed) to facilitate a higher efficiency charge. For example, if a 20V power supply is used, the battery booster 100 may bypass the SEPIC circuit (e.g., via a switchable shunt) or replace the SEPIC circuit with a buck converter, whereas, if 12 VDC power supply (e.g., a vehicle charger accessory) is used, the SEPIC circuit may be employed.

As noted above, the removable battery 194a may be provided as a removable battery pack 194 with its own battery pack housing 102c or as a removable battery 194a located within the housing 102a of the battery booster 100. For example, the battery booster 100 of FIG. 1c illustrates two removable batteries 194a, one external to the housing 102a and one internal and coupled to the power-management circuit 132 (e.g. via the battery charge controller 178). Where the removable battery 194a is part of the removable battery pack 194 and is external to the housing 102a of the battery booster 100, for example, power from the removable battery 194a may be received at power converter 184 via the interface 198 (functioning like the DC input terminal 154). Where the removable battery 194a has a nominal voltage that is greater than that of the external battery 104, the power converter 184 may be employed to convert the nominal voltage (e.g., 18 volts, 20 volts, etc.) to a jump-starting voltage (e.g., 12-volts).

The battery charge controller 178 can be used to charge the internal battery 160 and/or an internal removable battery 194a selectively, while the supercapacitor charge controller 180 can be used to charge the supercapacitor bank 163 selectively. In certain aspects, the supercapacitor bank 163 may be charged from the internal battery 160 and/or an internal removable battery 194a. Conversely, the power output controller 182 can be used to discharge power from the internal battery 160, the removable battery 194a, and/or the supercapacitor bank 163 selectively into the external battery 104, engine, or another load to be charged/boosted/started. The battery charge controller 178, the supercapacitor charge controller 180, and the power output controller 182 may be controlled selectively by one or more processors 128a, for example, in accordance with instructions (e.g., software algorithms) stored to a memory device 128b. In some examples, one or more of the memory devices 128b may be used to determine a warranty period. For example, one or more of the memory devices 128b may store the date of manufacture and/or sale, which can be used to trigger the start of a warranty period (e.g., 90 days, 1 year, 2 years, etc.).

The DC power may be output to the external battery 104 or other devices by way of a DC output terminal 136 (e.g., battery electrical conductors 166, battery clamps 168, etc.). Thus, power-management circuit 132 and processor 128a may control the charging operation of the external battery 104 to provide charging, maintaining, and, the jump-start function. While the power-management circuit 132 and processor 128a are illustrated as separate components, one of skill in the art would appreciate that power management functionality (e.g., battery charging, battery maintaining, etc.) may be provided as a single component that combines the functionality of the power-management circuit 132 and processor 128a.

The power output controller 182 may comprise, for example, one or more switches, one or more DC-to-DC converters 112, and a pulse width modulation (PWM) driver 110. In some examples, the operator may select different values of PWM driver 110 (voltage PWM and current PWM), according to the external battery 104 of vehicle 106 to be jumped (such as 6V/12V/24V/48V battery), for charging supercapacitor bank 163, and external battery 104. Alternatively, the battery booster 100 can detect the battery voltage rating of the vehicle 106 (e.g., by measuring a voltage across the clamps), then reconfigure the supercapacitor bank 163, and automatically choose an appropriate PWM to charge supercapacitor bank 163, the external battery 104, etc. The one or more switches may include, for example, a battery switch 189, one or more battery switches 190, a boost switch 191, and one or more supercapacitor switches 192. The one or more switches may be controlled via the processor 128a and/or the PWM driver 110. The speed (i.e., duty cycle) at which the one or more switches may be switched (i.e., opened and closed) can be controlled via the PWM driver 110. As noted above, the one or more switches may be mechanical switches and/or solid-state switches. In certain aspects, a PWM driver may be employed with the power converter 184 to control charge of the internal battery 160, removable battery 194a, and/or supercapacitor bank 163. The battery booster 100 may employ, via the supercapacitor charge controller 180, current PWM control with a buck converter to control charge current to the supercapacitor bank 163 for the optimum charge levels. In another example, the battery booster 100 may use of voltage PWM control with buck converter to control max charging voltage of the supercapacitor bank 163 or the external battery 104 avoiding over-voltage charging.

The output power may be controlled by switches and software. The power output controller 182 may employ a battery switch 189 to control power transfer from the battery clamps 168 to the power output controller 182, while boost switch 191 (e.g., a jump start switch) is used to control power transfer of a boost current from the power output controller 182 to the battery clamps 168. The boost switch 191 may be placed between the power bank 158 and the vehicle 106 on the positive lead. In other examples, however, the boost switch 191 may be placed between the power bank 158 and the vehicle 106 on the negative lead. In some examples, the boost switch 191 is positioned in the second housing 102b and controlled by a processor based on measurements at the set of battery clamps 168 (e.g., voltage, polarity, etc.). In one example, a solid state switch (e.g., a FET) may be in parallel with a relay to prevent arcing on the relay contacts, where the solid state switch would only carry current for a short period of time (e.g., 1 to 10 milliseconds) to prevent overheating. In another example, the battery switch 189 and/or the boost switch 191 is electrically connected in series (e.g., on the hot/live lead) and positioned either in the housing 102a of the battery booster 100 or the second housing 102b. The one or more battery switches 190 may be selectively controlled to output DC power from the internal battery 160 to one or more of the DC output terminals 136, while the one or more supercapacitor switches 192 may be selectively controlled to output DC power from the supercapacitor bank 163 to one or more of the DC output terminals 136 (e.g., the DC booster output 136a). In some examples, the boost switch 191 may be closed at an optimum battery voltage levels so that key detection is not required. Correspondingly, the boost switch 191 may be opened at an optimum voltage level for the supercapacitor bank 163, to recharge the supercapacitor bank 163 for the next jump start attempt.

The one or more battery switches 190 and the one or more supercapacitor switches 192 may be selectively controlled as a function of one or more parameters, such as maximum current over time, maximum temperature of battery, maximum time alone and/or minimum voltage (with or without time). Thus, when a parameter value is exceeded (or a requirement isn't met), the output voltage may be shut off. The battery booster 100 may include the ability to sense, or otherwise detect, that a battery (or other load/power supply) is coupled to the battery clamps 168. When a battery is not detected, the power may be shut off; however, the user may be provided with a manual override option (e.g., by holding a button for a predetermined amount of time, such as 2 to 10 seconds, or about 5 seconds). In certain aspects, the battery booster 100 may not charge an external battery 104 when the external battery 104 is too hot or cold, thereby avoiding potential hazards, and maintaining efficiency.

When the desired nominal voltage of the boost current at the DC output terminals 136 (e.g., the DC booster output 136a) is the same as the nominal voltage of the internal battery 160, a DC-to-DC converter may be omitted. When the desired nominal voltage at the DC output terminals 136 (e.g., first DC accessory output 136b, the second DC accessory output 136c, etc.) is different than the voltage a DC-to-DC converter 112 may be used to adjust the voltage upward or downward. For example, when the nominal voltage of the internal battery 160 is 16-volts DC and the first DC accessory output 136b is a 5-volt USB port, the DC-to-DC converter 112 may convert the voltage of the power received from the internal battery 160 via the battery switches 190 from 16 volts to 5 volts.

While not necessarily illustrated in FIG. 1c, power from the power bank 158 or the power-management circuit 132 may be allocated to the other components, including, inter alia, the processor 128a, input/output interface(s) 126, etc. For example, AC power may be drawn from an AC power supply 148, converted to DC power (via AC-to-DC converter 186), and used to charge the external battery 104 and/or the power bank 158. For instance, the battery booster 100 may be removably coupled with an AC power supply 148 located outside the housing 102 or housings 102a, 102b (e.g., a wall outlet) via an AC input terminal 134 and an AC-to-DC converter 186. In such an example, an AC wall charger may receive 120 VAC or 240 VAC from an electrical wall outlet and output, via an inverter, 12 VDC (or another desired DC voltage) to the input socket (e.g., DC input terminal 154) of the battery booster 100.

DC input power can be received from a DC power supply 156 via DC input terminal 154, or either AC power supply 148 via an AC-to-DC converter 186. The DC input power is received by power converter 184 and output to the internal battery 160 and/or the supercapacitor bank 163, in parallel, via an internal battery charge controller 178 and a supercapacitor charge controller 180, respectively. The internal battery charge controller 178 and a supercapacitor charge controller 180 may be used to monitor the parameters of the internal battery 160 and the supercapacitor bank 163, such as the charge level or status. The supercapacitor bank 163 and internal battery 160 may receive charging current from the DC input power.

The power-management circuit 132 and processor 128a may facilitate reverse hook-up protection, as well as automatic nominal battery voltage detection. The power-management circuit 132 and processor 128a may facilitate battery detection for shorted cell or frozen based on the energy being supplied by the battery booster 100. The battery booster 100 may further include the ability to sense the occurrence of a manual override, and, if voltage is still zero after engine start, the user may be instructed to check and replace the external battery 104 of the vehicle 106. Further, an automatic shut-off function may be provided if a battery/load/power supply is not attached to the battery clamps 168 within a predetermined amount of time (e.g., about 1 to 60 minutes, more preferably about 1 to 30 minutes, most preferably about 1 to 15 minutes). The battery booster 100 may further preheat a cold battery by, for example, running amperes though the battery, or using an internal heater 199 associated with power bank 158; an example of which is described in greater detail in connection with FIG. 9. The battery booster 100 may further employ alternate power sources, such as a solar panel to enable battery maintaining and charging, as well as data monitoring through solar panels (e.g., one or more 12-14 Watt panels). For example, solar cells may be used to charge or maintain fleet vehicles, such as vehicle dealership fleets, rental vehicles fleets, etc.

To use the jump-start function, the DC output terminal 136 may be coupled to the external battery 104 (i.e., the battery to be charged/jumped, whether directly or indirectly) and the user interface 138 may be used to activate the boost feature. The jump-start function may also be selected by a user via a portable electronic device 152 over a communication network 170.

If the battery booster 100 is performing another function when the jump-start function is selected, the display device 114 may indicate that the jump-start function cannot be performed at this time. If the battery clamps 168 are improperly connected (e.g., reverse polarity or disconnected), an aural alarm may sound, and the display device 114 may display a warning message, such as "Warning—Reverse Polarity" or "Warning—Battery Disconnected." Conversely, if the battery clamps 168 are properly connected and the battery booster 100 is ready for use, the display device 114 may display a standby message, such as "Jump Start Ready." If the jump-start function of the battery booster 100 is attempted twice within a predetermined time period (e.g., a minute), the jump-start function may be prohibited until the battery booster 100 has cooled down. During the cool down period, the display device 114 may display a cool down message, which may also indicate the remaining time for the cool down period. In some aspects, an audible alarm may be provided when the 100 is ready to provide a jump start current, such as a beep or a beep count down.

If the voltage of the external battery 104 is too low for the battery booster 100 to detect that the battery clamps 168 are connected (e.g., below 1 volt), a manual start procedure (e.g., the manual override) may be selected to enable the jump-start function. To use the manual start procedure, the DC output terminal 136 may be coupled to the external battery 104 and the user interface 138 may be used to activate the boost feature. For example, the same button may be used to trigger the jump-start function, but instead of a momentary press, the button may be pressed and held for a predetermined period of time (e.g., about 2 to 10 seconds, more preferably about 2-5 seconds) until the display device 114 displays the standby message. In certain aspects, the manual start procedure may override safety features to ensure that power is delivered regardless of connection status, in which case the battery booster 100 may energize the battery clamps 168 and cause sparking if they are touched together (i.e., shorted). The battery booster 100 may provide a low vehicle battery voltage protection such that battery booster 100 will not attempt to jump start or charge an external battery 104 that is still below a minimal level after a prescribed period of time.

There are a number of ways in which the power bank 158 may be charged. The user may also charge the internal battery 160 while driving via the DC input terminal 154 (e.g., using a 12 VDC car charger that couples to the cigarette lighter). Accordingly, a 12 VDC input socket may be used to recharge the battery booster 100 to a point where the power bank 158 is charged. The battery booster 100 may then be used to jump start a vehicle 106 having an external battery 104. In certain aspects, the battery booster 100 may be charged through the battery clamps 168, which may be retractable and/or configured to be housed in a recess of the housing 102 of the battery booster 100. For example, charging may be accomplished by leaving the boost switch 191 closed, thereby allowing the alternator in the vehicle 106, which can provide up to 70 A, to rapidly charge the internal battery 160 (or other component of the power bank 158). Thus, the battery booster 100 may be configured to sense the current in a bidirectional manner through the battery clamps 168. For example, (1) to measure current going from the battery booster 100 into the external battery 104, and (2) from the external battery 104 into the battery booster 100. To prevent overheating when current is passing into the battery booster 100, a temperature sensor may be coupled to the battery booster 100, whereby the boost switch 191 is shut off if the battery booster 100, or the internal battery 160, reaches a predetermined shut-off temperature threshold. Indeed, a benefit of maximizing the amount of current going back into the battery booster 100 is that it yields a faster charge.

While the power output controller 182 serves to provide power from the power bank 158 to the DC output terminals 136, the power output controller 182 may also be configured to back-feed power from the DC output terminals 136 to the power bank 158, whether directly to the power bank 158 or via the power converter 184. In an example operation, the power converter 184 may draw current from the depleted external battery 104 (e.g., via the power output controller 182), which could be used to charge the power bank 158, or portion thereof. For example, a depleted external battery 104 can typically charge the supercapacitor bank 163; therefore, when DC input power is unavailable at the DC input terminal 154 and the AC-to-DC converter 186, for instance, the supercapacitor bank 163 may receive charging current from external battery 104 via the power converter 184. By way of illustration, if an external battery 104 having a nominal voltage of 12 VDC has depleted to 6 VDC, the external battery 104 may be unable to start a vehicle 106, but a portion of the remaining power may be drawn from the depleted external battery 104 and used to charge the supercapacitor bank 163, which could then be later used to boost the vehicle 106.

When a supercapacitor bank 163 is simply coupled to a depleted battery (e.g., external battery 104), the finite energy reserve of the supercapacitor bank 163 is drained into the depleted battery, often lowering the voltage of the supercapacitor bank 163 to a level that cannot start an engine. While an internal battery 160 can start an engine when it has sufficient power to override the discharging effects of a depleted vehicle battery, the peak current that an internal battery 160 can supply may be limited due to the temperature (i.e., in cold weather) that can affect the chemical reaction inside the jump starter battery. This limit in peak current may be such that the engine may not turn over. Therefore, both an internal battery 160 and a supercapacitor bank 163, where the internal battery 160 cannot supply sufficient current to overcome the effects of the depleted external battery 104, while the supercapacitor bank 163 may supply the peak current and are more reliable in cold weather than batteries.

A battery (e.g., the internal battery 160, the removable battery 194a, a small lithium battery, etc.) may be used in combination with the supercapacitor bank 163 to prevent the supercapacitor bank 163 from discharging the current back to the depleted external battery 104 until the battery booster 100 may determine that the user trying to start the vehicle 106. For example, if a drop in voltage is detected at the DC booster output 136a, the processor 128a may determine that the user is attempting to start the vehicle 106 and the supercapacitor charge controller 180 may be instructed to electrically couple the supercapacitor bank 163 to the external battery 104 (via DC output terminal 136), thereby causing the supercapacitor bank 163 to quickly discharge into the external battery 104, thereby enabling the vehicle 106 to start. In another example, the supercapacitor bank 163 may be configure, via power-management circuit 132, to quickly discharge into the external battery 104 upon detecting a drop in voltage of the internal battery 160 or the removable battery 194a (rather than the voltage across the battery clamps 168). The processor 128a may be similarly configured to control the power output controller 182, which enables the internal battery 160 to discharge into the external battery 104.

Once the engine that is coupled to the depleted external battery 104 has been started, the power from the alternator may be back fed into the battery booster 100 and used to charge the power bank 158 (e.g., the internal battery 160 and/or the supercapacitor bank 163). As will be discussed, the amount and duration of power back-fed from the DC output terminals 136 to the power bank 158 may be controlled via the PWM driver 110, for example.

The internal battery 160, the internal removable battery 194*a*, and the supercapacitor bank 163 can each be recharged by the power converter 184, which may receive any input voltage between, for example, 5 VDC to 20 VDC. The internal battery charge controller 178 recharges the internal battery 160 inside the battery booster 100, while a supercapacitor charge controller 180 charges the supercapacitor bank 163. The supercapacitor bank 163 may also be recharged from the internal battery 160, thereby providing multiple peak current starts. The jump-start function is controlled by one or more processors 128*a* once the jump starter cables are attached to an external battery 104 and the jump-start function is engaged (either manually or automatically). The internal battery 160 may be connected by a circuit with one or more switches to the external battery 104 of the vehicle 106. The internal battery 160 transfers energy into the external battery 104 and when the vehicle ignition is actuated (e.g., the key is turned, or the start button is pressed), current drawn from the starter motor will cause a voltage drop across the jump starter connection clamps 168. This voltage drop may be detected by the one or more processors 128*a*, at which point the one or more processors 128*a* will electrically couple the supercapacitor bank 163 in parallel with its internal battery 160 to supply the peak current required to start the engine. If the engine starts, the jump starter function is done and the battery booster 100 can recharge itself (e.g., the internal battery 160 and/or the supercapacitor bank 163) from an electrical connection to the electrical system of the vehicle 106, which may continue until the internal battery 160 and/or the supercapacitor bank 163 are fully charged. After which the battery booster 100 may shut off its charging function, or the battery clamps 168 are removed. If the vehicle 106 does not start, once the starter is disengaged the voltage on the external battery 104 will stabilize and the supercapacitor bank 163 will recharge from the internal battery 160 (or any available power from the external battery 104), and prepare for the next attempt to start the engine, whereby the process is repeated. In certain aspects, a high current may be provided by the battery booster 100 at the beginning of the jump start cycle to power on various modules of vehicle 106.

In lieu of battery clamps 168, the charger cables (e.g., battery electrical conductors 166) of the battery booster 100 may be fixedly coupled to the external battery 104 (e.g., via a bolt and ring terminals) and configured to quick connect to battery booster 100 (e.g., using quick connects/disconnect connectors). In certain instances, the quick connect connectors may not be compatible with different devices. Due to the inconvenience of disconnecting and reconnecting the fixedly coupled connections, it may be advantageous to use a charger cable that fixedly couples to the external battery 104 at one end, but provides a plurality of different connectors at the second end. For example, the first end may be fixedly coupled to a battery terminal through the ring terminals, while the second end may be provided with two connecters, namely (1) an EC5 (male) connector configured to couple with an EC5 (female) connector of the battery booster 100 and (2) a second (male) connector configured to couple with a second (female) connector of a battery charger/maintainer.

Other connectors are contemplated, such as Anderson connectors. One or more end caps may be further provided to protect the unused connector from dirt and debris. Such a charger cable would be of particular use for vehicles that are not often used and typically require jump starting. In other aspects, the charger cables of the battery booster 100 may be configured to quick connect to battery booster 100 using magnetic connectors. For example, the magnetic connectors may employ an electrical plug and receptacle that relies on magnetic force to maintain contact. A housing of the magnetic connectors may be physically shaped to ensure proper polarity when coupled (e.g., preventing the magnetic couplings from becoming coupled upside down). While two connectors are described, such a charger cable need not be limited to two connectors, nor should it be limited to the example connector types described.

In another alterative, the entire battery booster 100 may be permanently coupled to an external battery 104 or an electrical system of the vehicle 106 (e.g., installed under the hood or inside the vehicle). For example, the battery booster 100 may be fixedly coupled to the vehicle and remotely actuated using a physical button or controller (e.g., one positioned under the hood, on the dashboard, in the glove box, etc.), or wirelessly. In another example, the battery booster 100 may function as a trickle charger to maintain a charge on the external battery 104. When integrated with the vehicle, the housing 102 of the battery booster 100 may be fabricated to mitigate damage from engine temperature or engine fluids. Wireless control may be accomplished using, for example, a portable electronic device 152 that is communicatively coupled to the battery booster 100 via a communication network 170. For instance, a smart phone may wirelessly send a signal to the battery booster 100, either directly or through the electrical system of the vehicle 106, which causes the battery booster 100 to output boosting energy or charging energy to the external battery 104 of the vehicle 106. For example, an operator may charge the supercapacitor bank 163 via a command over the communication network 170 from a portable electronic device 152.

The wireless communication may employ one or more wireless standards such as Bluetooth (e.g., short-wavelength, UHF radio waves in the ISM band from 2.4 to 2.485 GHz), NFC, Wi-Fi (e.g., IEEE 802.11 standards, Cat-M), etc. When permanently coupled to the external battery 104 or electrical system of the vehicle 106, the battery booster 100 may charge the internal battery 160 when the vehicle 106 is running via the electrical system of the vehicle 106 (e.g., 12 VDC supply).

In some examples, the battery booster 100 may communicate with a portable electronic device 152 via a communication network 170 or directly with a portable electronic device 152. In operation, a user may control the battery booster 100, monitor live charging status updates, charging conditions, historic data, remotely update software and firmware, and stay connected with the battery booster 100 news and updates from the manufacturer via the communication network 170 and a booster management server 174. In certain aspects, an internal cellular modem may be implemented that utilizes standards-based wireless technologies, such as 2G, 3G, 4G, Code Division Multiple Access (CDMA), and Global System for Mobile Communications (GSM), to provide wireless data communication over worldwide cellular networks. An advantage of an internal cellular modem is that there is no reliance on a local network (e.g., wireless router, modem, etc.) of the user, thereby enabling communication between the battery booster 100 and communication network 170, even in the event of a total power failure in at the location of user. Therefore, one or more routers 176 (e.g., Wi-Fi routers, cellular towers, etc.) may be used to connect the battery booster 100 to the communication network 170.

In certain aspects, the battery booster 100 may comprise one or more coils 135 to facilitate wireless charging through, for example, inductive or resonant coupling with another coil. The one or more coils 135 may be positioned in or on the first housing 102a and configured to function as a transmitter to provide wireless power, as a receiver to receive wireless power, or as a combination thereof. Through coupling, electric power can be wirelessly transmitted between the battery booster 100 and another device (e.g., a charging pad or one or more portable electronic devices 152). For example, the battery booster 100 may be placed on a charging pad to charge the internal battery 160 and/or supercapacitor bank 163 of the battery booster 100. In another aspect, one or more portable electronic devices 152 may be placed on the battery booster 100 (e.g., on the first housing 102a) and charged using power from the internal battery 160 and/or the removable battery 194a via the one or more coils 135. In another aspect, the battery booster 100 may be configured to both charge and be charged using the one or more coils 135 (i.e., bi-directionally) depending on, for example, a user setting.

In an example, the charging inductor pad may comprise one or more induction coils that create an alternating electromagnetic field from within a charging inductor pad and one or more coils 135 in or on the battery booster 100 that receive power from the electromagnetic field and converts the received power into electric current to charge the internal battery 160. The two induction coils in proximity combine to form an electrical transformer. Greater distances between transmitter and receiver coils can be achieved when the inductive charging system uses resonant inductive coupling. The coils may be fabricated using a number of materials, such as silver plated copper (or aluminum) to minimize weight and decrease resistance resulting from the skin effect. The charging inductor pad and the battery booster 100 may operate in compliance with one or more wireless power transfer standards, such as the Power Matters Alliance (PMA) under the IEEE Standards Association (IEEE-SA) Industry Connections, Rezence, and Qi. The PMA interface standard describes analog power transfer (inductive and resonant), digital transceiver communication, cloud based power management, and environmental sustainability.

Figure 1D:
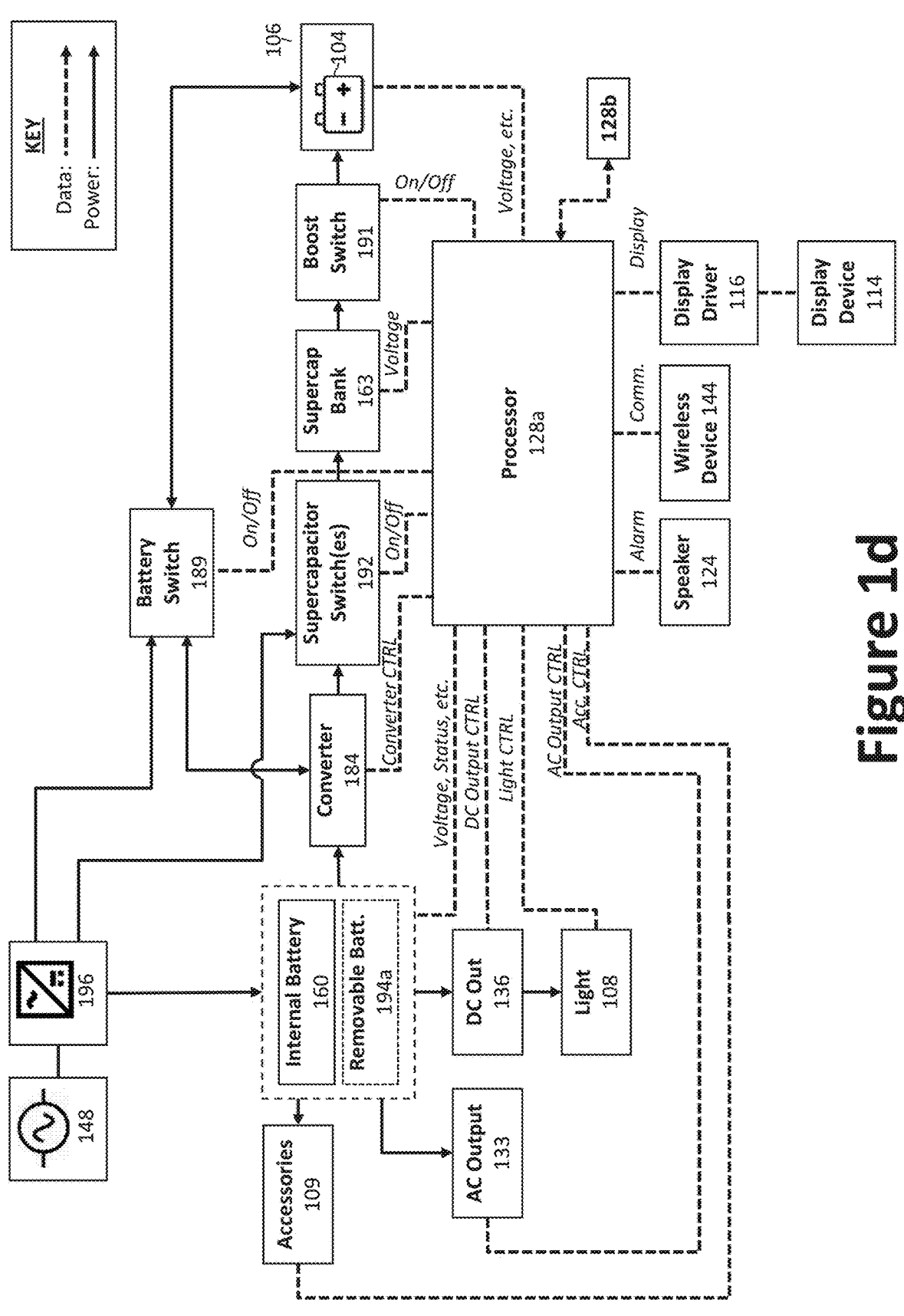
FIG. 1d illustrates a schematic diagram of another example battery booster.

FIG. 1d illustrates a schematic diagram of an example battery booster according to one example. As illustrated, one or more processors 128a generally control the overall operation of the battery booster 100. The one or more processors 128a may output various control (CTRL) command to the various components. For example, the one or more processors 128a may output DC output control commands to control the DC output terminals 136 (e.g., a USB port), AC output control commands to control the AC output terminals 133 (e.g., a DC-AC inverter to output 120 VAC, 240 VAC, etc.), accessory commands to control accessories 109, such as an air compressor. The one or more processors 128a are configured to open and close the various switches via on/off commands (e.g., the battery switch 189, the boost switch 191, supercapacitor switches 192, etc.) to control charge and discharge based on one or more measured parameters. The one or more processors 128a are also configured to control operation of the power converter 184 via a converter command. In one example, the one or more processors 128a may monitor the voltage, status, etc. of the batteries (whether an internal battery 160 and/or a removable battery 194a), the supercapacitor bank 163, and the external battery 104. In certain aspects, power may be provided to the DC output terminals 136 upon detection of a device being plugged in. For example, the one or more processors 128a may detect a USB plug at the DC output terminal 136 an automatically supply power upon detecting a current draw by the USB device or by sensing the physical presence of the connector.

When using a supercapacitor bank 163 having one or more supercapacitors 162 to start an engine (e.g., of a vehicle 106) that is electrically coupled with the external battery 104, increasing the voltage of the supercapacitor bank 163 provides additional energy for starting the engine. For example, increasing the voltage on a supercapacitor bank 163 by 10% increases its energy content by over 20%, whereas increasing the capacitance of a supercapacitor bank 163 by 10% would only increase the energy by 10%. Therefore, increasing voltage yields a greater benefit than simply increasing capacitance of supercapacitor bank 163. Further, supercapacitors can normally tolerate higher voltage than their rated voltage for a short period. In some examples, the battery booster 100 can discharge supercapacitor bank 163 down to lower voltage when jumpstart is not needed.

While the largest criteria that impacts the design of a battery booster 100 is the ability to reliably start a vehicle 106, cost is also a major factor. Large supercapacitors 162 that are sufficient for engine-starting are very expensive. Therefore, to provide a cost effective, reliable battery booster 100, supercapacitors 162 can be selected with the smallest value that will fit the engine starting design criteria (e.g., to provide a desired voltage, capacitance, and CCA).

To provide adequate power, while also maintaining a viable price point, the battery booster 100 may employ supercapacitors 162 with a rated voltage that are electrically connected in series to yield a total rated voltage for the supercapacitor bank 163. The total rated voltage of the supercapacitor bank 163 is equal to the number of supercapacitors 162 multiplied by the rated voltage of the individual supercapacitors. The total voltage of the supercapacitor bank 163 is typically dictated by the nominal voltage of the external battery 104. In one example, where an external battery 104 has a nominal voltage of 12-volts, a supercapacitor bank 163 may be employed that has four or five supercapacitors 162 connected in series, where each supercapacitor 162 is rated at 2.7 volts and 400 farads, which yields a supercapacitor bank 163 with a total rated voltage of about 10.8 volts and 13.5 volts, respectively. In another example, six supercapacitors 162 connected in series to provide a total rated voltage of about 16.2 volts.

Charging the supercapacitor bank 163 to a charge voltage that is greater than its total rated voltage for a short period of time before an attempt to start the engine provides unexpectedly higher engine starting performance, which can be attributed to the additional energy in the supercapacitor bank 163. Charging and using an engine starting supercapacitor bank 163 at a charge voltage that is greater than its rated voltage; however, will shorten the life of the supercapacitor bank 163. The normal life of supercapacitors 162 is in the millions of charge/discharge cycles. A battery booster 100 only needs a useful life of 10,000 jump starts (i.e., charge/discharge cycles); therefore, the decrease in life resulting from using the supercapacitor bank 163 in an over-voltage condition will not materially affect the useful life of the battery booster 100. In some examples, the charge voltage may be 5 to 15 percent higher than the rated voltage of the supercapacitor bank 163, or at least 10 percent higher than the rated voltage.

The battery booster 100 monitors, via one or more processors 128a and sensors 188, the voltage of the supercapacitor bank 163 to minimize the decrease in the life of the supercapacitor bank 163 during both charge and discharge of the supercapacitor bank 163. To that end, the power-management circuit 132 includes a supercapacitor charge controller 180 to control, via one or more processors 128a, charge and discharge of the supercapacitor bank 163. Once the engine is started, for example, the vehicle 106 will recharge the supercapacitor bank 163 via its alternator (a generator). The battery booster 100 is configured to monitor the voltage of the supercapacitor bank 163 during the charge cycle of the supercapacitor bank 163 and to electrically disconnect the supercapacitor bank 163 from the vehicle 106 using the power output controller 182 (e.g., via one or more supercapacitor switches 192) once the supercapacitor bank 163 is fully charged. For example, the battery booster 100 prohibits the voltage of the supercapacitor bank 163 from exceeding its rated voltage beyond a short period of time (e.g., less than a minute). If the voltage of the supercapacitor bank 163 exceeds its rated voltage beyond the short period of time, the supercapacitor charge controller 180 partially discharges the supercapacitor bank 163 via a discharge circuit to reduce the voltage of the supercapacitor bank 163 to, or just below, its rated voltage. Any excess energy in the supercapacitor bank 163 could also be used to recharge the internal battery 160 and/or a removable battery 194a. In some examples, the discharge circuit may discharge power from the supercapacitor bank 163 to one or more resistors, which dissipate the excess power as heat. In another example, the discharge circuit may discharge power from the supercapacitor bank 163 to existing relay coils, lights, other onboard electronic circuits, etc.

The supercapacitor charge controller 180 is also configured to prevent complete discharge of the supercapacitor bank 163. When using a supercapacitor bank 163 to jump start a vehicle 106, the supercapacitor bank 163 must first be charged, which can take some time. Supercapacitor 162 have a very low self-discharge current, which means its voltage discharges very slowly. Therefore, the supercapacitor charge controller 180 maintains at least a partial charge on the supercapacitor bank 163. In one example, the supercapacitor bank 163 may be kept at about 75% charged. In view of the foregoing, the time to recharge the supercapacitor bank 163 between jump starts is greatly reduce because the supercapacitor bank 163 is not fully discharged during a jump start, even if weeks elapse between jump starts.

Figure 1E:
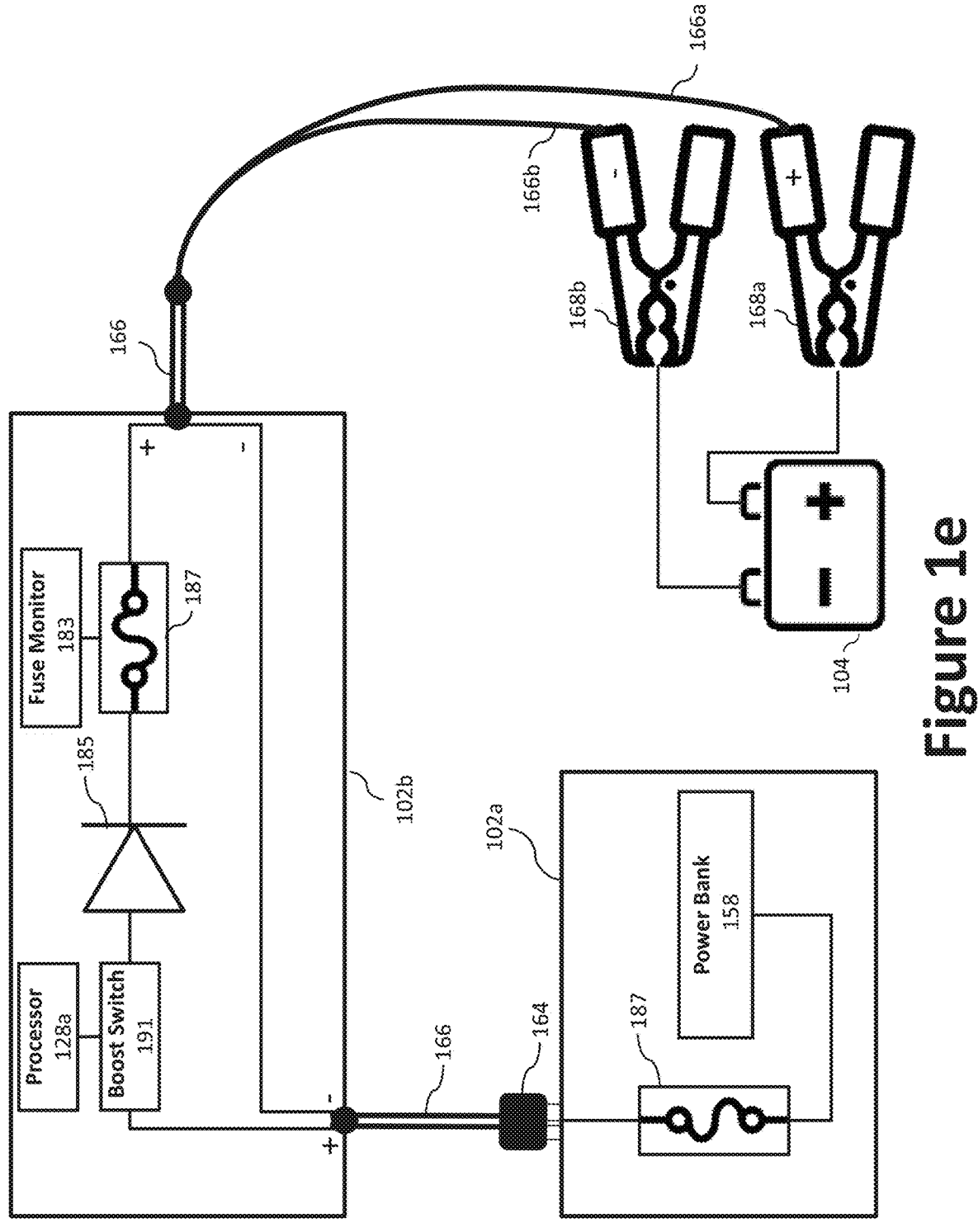
FIG. 1e illustrates a schematic diagram of example clamp circuitry.

As noted above, clamps with in-line control (e.g., smart clamps) may be employed by placing circuitry and certain components in line between the detachable electrical ports/connectors 164 and the set of battery clamps 168 (e.g., via the second housing 102b). For example, a processor 128a and/or components of the power-management circuit 132 may be provided in the second housing 102b to control power transfer between the power bank 158 (at the detachable electrical ports/connectors 164) and the vehicle 106 (at the set of battery clamps 168) based on various measurements (e.g., voltage, current, polarity, etc.). The processor 128a may monitor, via one or more sensors, various parameters of the vehicle 106 (e.g., the external battery 104) and/or the battery booster 100 (e.g., the power bank 158). In certain aspect, however, the circuitry in the second housing 102b may be simplified to reduce manufacturing costs and reduce complexity of the overall battery booster 100. For example, in some cases, the set of battery clamps 168 may be connected directly to the detachable electrical ports/connectors 164 and any switching and/or intelligence may be provided by components located in the first housing 102a. In another example, pared down circuitry may be provided in the second housing 102b to provide essential safety features, while also reducing cost by omitting more advanced functions. For example, FIG. 1e illustrates an example where a boost switch 191 is used with one or more fuses 187 and/or diodes 185 to control power transfer between the power bank 158 and the vehicle 106, while in some cases obviating the need for more complicated processors, sensors, and/or switching circuitry. As illustrated, the boost switch 191, the fuse 187, and/or diode 185 may be placed between the power bank 158 and the vehicle 106 on the positive lead. By placing the boost switch 191 on the positive lead, power is cut off before it can enter the external battery 104 and, therefore, power is unable to transfer to the external battery 104 in the event of the negative terminal of the battery shorts to the battery booster 100. In other examples, however, the boost switch 191 may be placed between the power bank 158 and the vehicle 106 on the negative lead.

In some examples, the boost switch 191 may be an electromechanical switch or a solid-state switch that can be controlled by a processor 128a in the first housing 102a or the second housing 102b. In other examples, the boost switch 191 may be a manually operated switch, which may be positioned on an exterior surface of the first housing 102a or the second housing 102b, thereby obviating the need for a processor 128a in the second housing 102b. In this example, the user interface 138 (e.g., an indicator, such as an LED) may be provided to indicate to the user that the battery booster 100 is correctly coupled to the vehicle 106 via the set of battery clamps 168 (i.e., connected and with a correct polarity). Once the user interface 138 provides such an indication (e.g., via an icon, an illuminated or flashing light, an audible sound, etc.), the operator may then manually actuate or otherwise engage the manually-operable boost switch 191 to enable power (i.e., a charge or boost current) to flow from (or between) the power bank 158 and the vehicle 106. The one or more fuses 187 and/or diodes 185 may be provided to protect the battery booster 100 and operator in the event the operator actuates or engages the manually-operable boost switch 191 before the user interface 138 provides such an indication. For example, if the boost switch 191 is engaged and the set of battery clamps 168 are connected in reverse polarity, the diode 185 will prohibit current from flowing into the battery booster 100 in the wrong direction and damaging internal components, whereas the one or more fuses 187 protect the battery booster 100 in the event of an over current condition (e.g., a short circuit across the battery clamps 168). In some examples, current flow may be monitored and current feedback can be used to detect a short or reverse connection condition, rather than monitoring the voltage of the power bank 158.

Therefore, as illustrated, the first housing 102a may include an optional internal fuse 187 (or an automatic switch, such as a circuit breaker). In this example, the internal fuse 187 may be a non-replaceable internal fuse, switch, or relay used to disconnect the power bank 158 when an overcurrent or over temperature condition is detected. The circuitry of the second housing 102b may also include an optional diode 185 and a replaceable fuse 187. The diode 185 may be used to protect battery booster 100 against reverse current or reverse battery conditions from the external battery 104, whereas the replaceable fuse 187 is used to protect against overcurrent. The fuse 187 may be user-replaceable and may be secured (physically and electrically) via a fuse holder. In some examples, a fuse monitor 183 may be provided to monitor the status (i.e., state) of the replaceable fuse 187. In one example, the fuse monitor 183 may be an electronic fuse detector that uses circuitry to provide an indication via the user interface 138 if the replaceable fuse 187 has been opened (i.e., blown or removed). In another example, the fuse monitor 183 may be a visible window fabricated from a transparent or semi-transparent material to enable the user to see the replaceable fuse 187 to determine whether the replaceable fuse 187 has been opened (i.e., blown).

Figure 2:
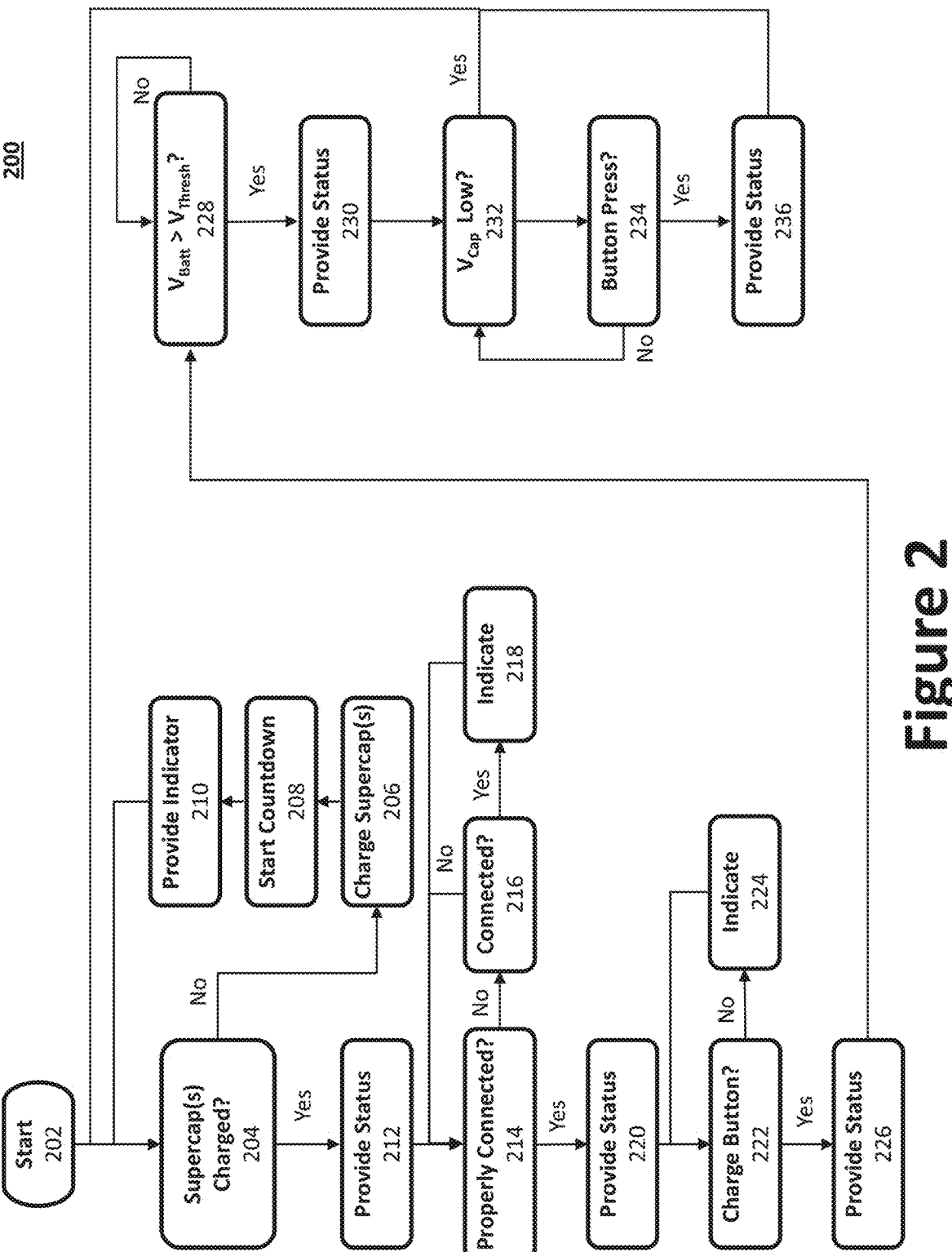
FIG. 2 illustrates a flow diagram of an example method of operating the battery booster in accordance with an aspect of the present disclosure.

FIG. 2 illustrates a method 200 of operating the battery booster 100 in accordance with one aspect. In this example, the display device 114 may employ a charge LED and a battery LED that are configured to change color (e.g., between red, green, yellow, etc.) and/or to flash at one or more rates (or patterns) to provide status information. In addition to, or in lieu of, LEDs, however, an LCD display or another device may be used. In another aspect, the functionality of the display device 114 may be provided via a portable electronic device 152 over a communication network 170.

At step 202, the method 200 is started. The method 200 may be started upon activation of the battery booster 100. The battery booster 100 may be activated (e.g., turned on or woken from a sleep mode) via a power button, a sensor, or via the portable electronic device 152.

At step 204, the battery booster 100, via processor 128*a* and/or one or more sensors, determines whether supercapacitor bank 163 (e.g., or a supercapacitor 162) is charged. If the supercapacitor bank 163 are not charged at step 204, the method 200 continues to step 206. If the supercapacitor bank 163 is charged at step 204, the method 200 continues to step 212.

At step 206, the battery booster 100, via the power-management circuit 132, provides a charging current to charge the supercapacitor bank 163. The charging current may be supplied from one or more of the external battery 104, the internal battery 160, the removable battery 194*a*, the AC power supply 148, and/or the DC power supply 156. The charging current may be supplied to supercapacitor bank 163 for a predetermined amount of time.

As can be appreciated, the predetermined amount of time will vary as a function of the power source and the rating of supercapacitor bank 163 (e.g., its charge status, capacity, size, etc.). For example, with a supercapacitor bank 163 rated to output between 450 and 800 cold cranking amps (CCA), the predetermined amount of time may be about 60-180 seconds when charged from the external battery 104, about 200-400 seconds when charged from the internal battery 160 or the removable battery 194*a*, about 200-400 seconds when charged from a 12-volt DC automotive socket (cigarette lighter), about 20-60 minutes when charged from a USB source, etc.

At step 208, the battery booster 100, counts down the predetermined amount of time, via a timer, until the supercapacitor bank 163 is fully charged.

At step 210, the battery booster 100, via display device 114, indicates that supercapacitor bank 163 is charging. For example, the display device 114 may display a flashing charge status LED or icon. The flashing charge status LED, for example, may be green.

At step 212, the battery booster 100 displays, via display device 114, that the supercapacitor bank 163 is fully charged and status information for the battery booster 100. For example, the display device 114 may indicate, a solid charge status LED or icon and/or "0.0 v" (zero volts) when the external battery 104 is not electrically connected, a solid green battery LED when the external battery 104 is electrically connected, or a flashing green battery LED when the external battery 104 is not electrically connected.

At step 214, the battery booster 100 determines whether the battery clamps 168 are properly connected electrically to the external battery 104. For example, the battery clamps 168 may be connected to the external battery 104, but with a reverse polarity (i.e., the battery clamps 168 are reversed). If the battery clamps 168 are not properly connected electrically to the external battery 104 at step 214, the method 200 proceeds to step 216; otherwise, if properly connected, to step 220.

At step 216, the battery booster 100 determines whether the battery clamps 168 are connected electrically to the external battery 104, for example, by measuring a voltage across the battery clamps 168. If voltage is detected (whether positive or negative), it can be assumed that the external battery 104 is connected.

If the battery booster 100 determines that the battery clamps 168 are connected electrically to the external battery 104, the method 200 proceeds to step 218 to provide an indication that battery clamps 168 are reversed before returning to step 214. For example, a flashing red battery LED may be used to indicate that the battery clamps 168 are reversed. If the battery booster 100 determines that the battery clamps 168 are not connected electrically to the external battery 104, the method 200 returns to step 214.

At step 220, the battery booster 100 displays a voltage of the external battery 104 and an indicator that the battery clamps 168 are properly connected electrically to the external battery 104. For example, a solid green battery LED may be used to indicate that the battery clamps 168 are properly connected.

At step 222, the battery booster 100 determines whether a charge button has been pressed to indicate a jump start process. The charge button may be provided via input/output interface 126 or over communication network 170. If the charge button has not been pressed, the method 200 proceeds to step 224. If the charge button has been pressed, the method 200 proceeds to step 226.

At step 224, a charge indicator is not provided and the method 200 returns to step 222. For example, the charge button LED remains off (not illuminated).

At step 226, the battery booster 100 initiates the jump start process and displays, via display device 114, the status. For example, the charge LED may flash yellow and a display device may momentarily shows "on".

At step 228, the battery booster 100, via processor 128*a* and/or one or more sensors, determines whether a voltage ($V_{Batt}$) of the external battery 104 is greater than a voltage threshold ($V_{Thresh}$). The voltage threshold ($V_{Thresh}$) may be a function of the nominal voltage, for example, 10.5 volts in the case of a 12-volt nominal battery. If the voltage of the external battery 104 is not greater than the voltage threshold, the method 200 enters a loop until the external battery 104 is greater than the voltage threshold. Because the battery booster 100 is electrically connected to the vehicle, the battery booster 100 can pre-charge the external battery 104 using power from the internal battery 160 or the removable battery 194*a*. Once the external battery 104 is greater than the voltage threshold, the method 200 proceeds to step 230. For example, the operator may "Push and Hold" a button via the user interface 138 for low vehicle battery levels, in which case the battery booster 100, may deliver a series of pulses to raise the vehicle battery voltage so as to get key detect to work, while not fully draining supercapacitor bank 163. In other example, the battery booster 100 may be operated as a battery maintainer with an auto shutoff when the voltage of the internal battery 160 or the removable battery 194a is depleted to a point where it is not able to jump start.

At step 230, the battery booster 100 indicates that the user can start the vehicle. For example, the charge button LED may be solid green.

At step 232, the battery booster 100 determines whether the voltage ($V_{Cap}$) of the supercapacitor bank 163 is low (e.g., below a voltage threshold). If the supercapacitor bank 163 is low, the method returns to step 204 to recharge the supercapacitor bank 163. If the supercapacitor bank 163 is not low, the method 200 proceeds to step 234.

At step 234, the battery booster 100 determines whether the charge button has been pressed again to indicate ending the jump start process. The battery booster 100 may enter a loop until the charge button is pressed or the battery booster 100 is shut down or enters a sleep mode after a period of inactivity (e.g., 30 minutes). If the charge button has been pressed, the method 200 proceeds to step 236.

At step 236, the battery booster 100 ends the jump start process and displays, via display device 114, the status before returning to step 204. For example, the charge LED may turn off and a display device may momentarily show "off", or another message. In some examples, the battery booster 100 may initiate another jump start process and displays, via display device 114, the status before returning to step 204. For example, the charge LED may flash yellow and a display device may momentarily shows "restart" or another message.

Figure 3:
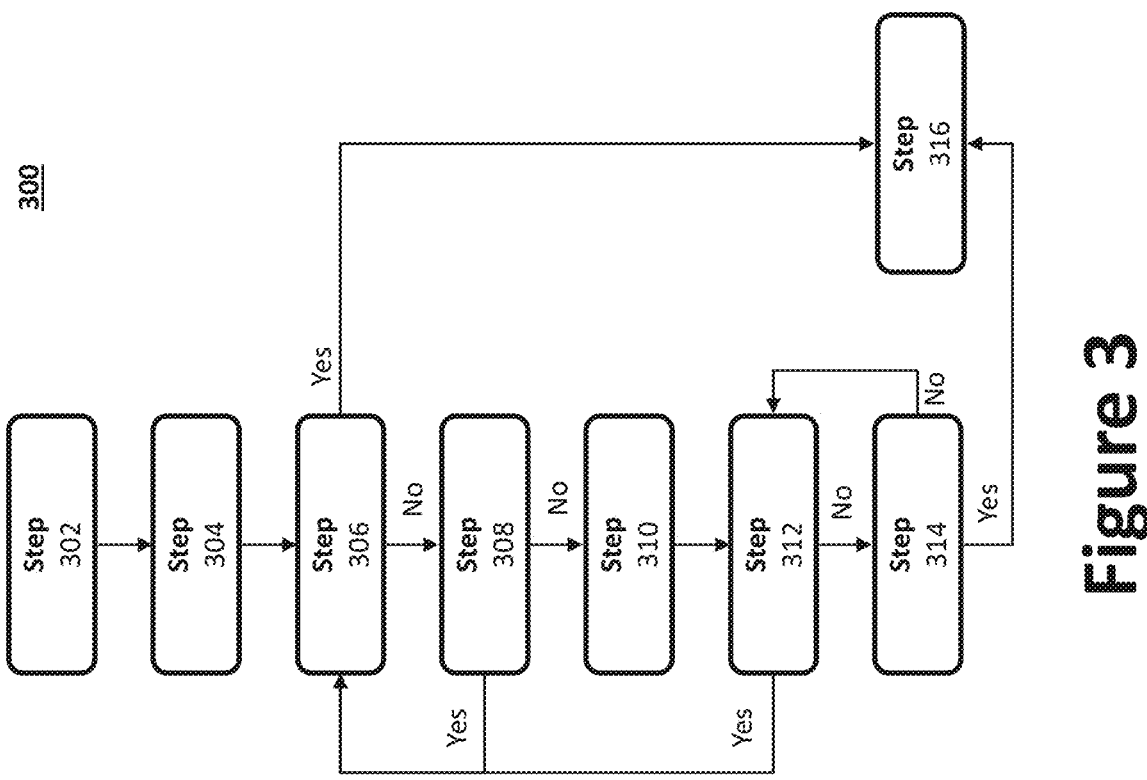
FIG. 3 illustrates a flow diagram of an example method of charging a portable device using the battery booster in accordance with an aspect of the present disclosure.

FIG. 3 illustrates a method 300 of charging a portable electronic device 152 via DC output terminals 136 in accordance with one aspect. For example, the DC output terminals 136 may be a USB port (e.g., to output 5 volts DC). To protect both the battery booster 100 and the portable electronic device 152, the current draw at the DC output terminals 136 should not exceed certain current draws (potentially damaging the hardware) or time durations (indicating that the load may not be taking a charge and/or draining the battery booster 100).

At step 302, the method 300 is started, for example, upon activation of the battery booster 100.

At step 304, the battery booster 100 enables USB charging of a portable electronic device 152 via power-management circuit 132.

At step 306, the battery booster 100 determines whether the current draw of the load (e.g., the portable electronic device 152) is greater than a first predetermined current (e.g., about 2.1 amps or greater). If the current draw is greater than the first predetermined current, the method skips to step 316 and USB charging is disabled. If the current draw is not greater than the first predetermined current, the method 300 proceeds to step 308.

At step 308, the battery booster 100 determines whether the current draw of the load is greater than a second predetermined current (e.g., about 50 mA). If the current draw is greater than the second predetermined current, the method returns to step 306 and USB charging continues. If the current draw is not greater than the second predetermined current, the method 300 proceeds to step 310.

At step 310, the battery booster 100 starts a timer and proceeds to step 312. The timer may be for a predetermine amount of time (e.g., 2 hours).

At step 312, the battery booster 100 determines whether the current draw of the load is greater than the second predetermined current. If the current draw is greater than the second predetermined current, the method returns to step

306 and USB charging continues. If the current draw is not greater than the second predetermined current, the method 300 proceeds to step 314.

At step 314, the battery booster 100 determines, via the timer, whether the predetermine amount of time has passed. If the predetermine amount of time has not passed, the method 300 proceeds to step 312. If the predetermine amount of time has passed, the method 300 proceeds to step 316.

At step 316, the USB charging is disabled (shut off).

Figure 4:
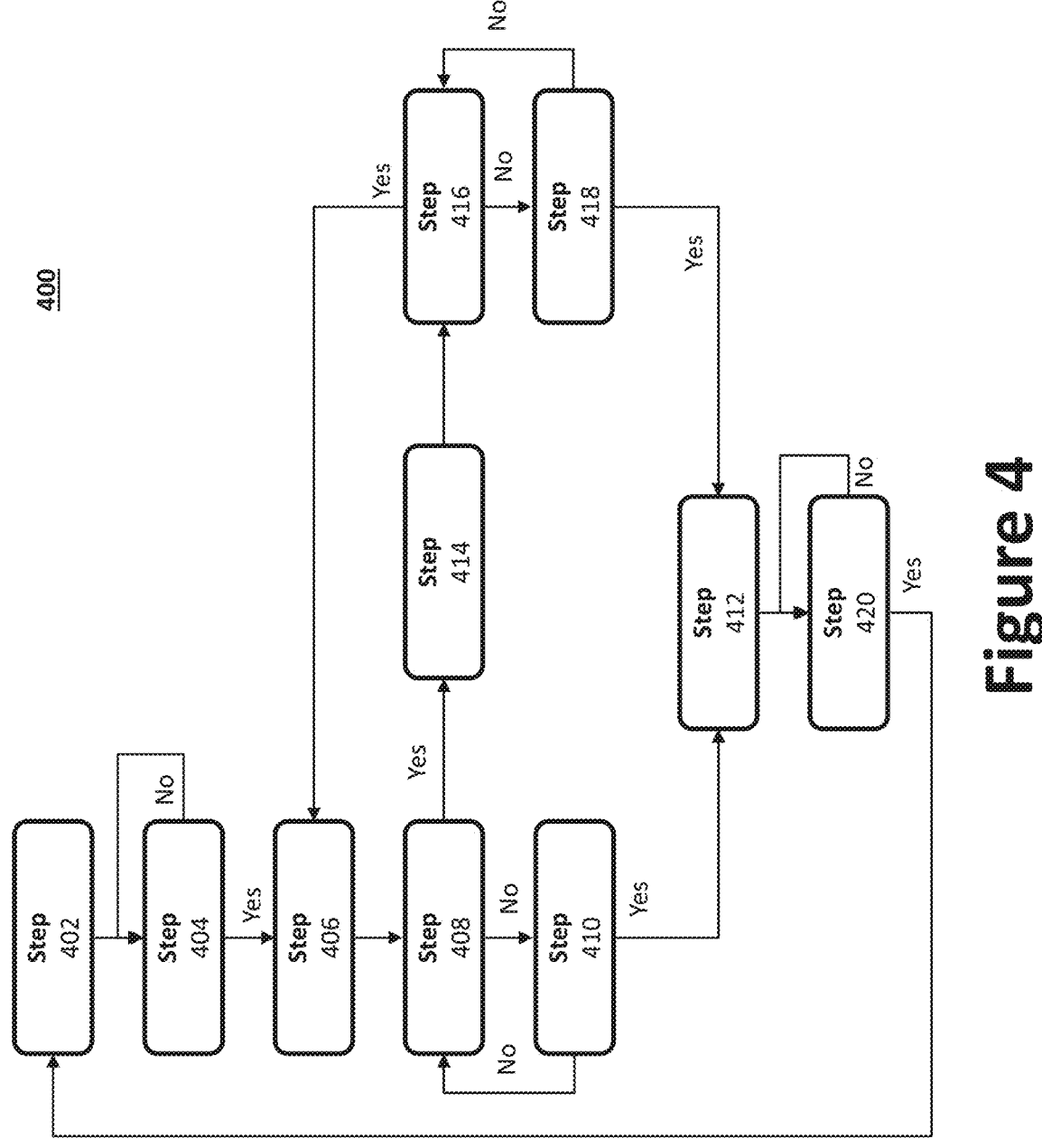
FIG. 4 illustrates a flow diagram of an example method of charging a portable device using the battery booster in accordance with an aspect of the present disclosure.

FIG. 4 illustrates a method 400 of controlling a light 108 in accordance with one aspect. The light 108 may be illuminated in accordance with a plurality of modes. The light output from the light 108 may be adjusted by adjusting the number of illuminated lights (e.g., via switches). In another example, the light 108 may be adjusted using PWM techniques (e.g., via a PWM driver).

At step 402, the method 400 is started. Upon start up, the light 108 is off (i.e., not illuminated).

At step 404, the battery booster 100 determines whether a light button has been pressed to activate the light 108. The light button may be provided via input/output interface 126 or over communication network 170. The battery booster 100 may enter a loop until the light button is pressed or the battery booster 100 is shut down or enters a sleep mode. If the light button has been pressed, the method 400 proceeds to step 406.

At step 406, light 108 is illuminated in a first mode and a first operation and the method 400 proceeds to step 408. The first mode may be a low intensity (e.g., dim) setting and the first operation may be a constant pattern (i.e., steady light).

At step 408, the battery booster 100 determines whether a mode button has been pressed. If the mode button has been pressed at step 408, the method 400 proceeds to step 414; otherwise, the method 400 proceeds to step 410.

At step 410, the battery booster 100 determines whether the task button has been pressed again. If the task button has been pressed at step 410, the method 400 proceeds to step 412; otherwise the method 400 returns to step 408.

At step 412, light 108 is illuminated in accordance with a second operation and the method 400 proceeds to step 420. The second operation may be a strobe pattern.

At step 414, light 108 is illuminated in accordance with a second mode and the method 400 proceeds to step 416. The second mode may be a high intensity (e.g., bright) setting.

At step 416, the battery booster 100 determines whether the mode button has been pressed again. If the mode button has been pressed at step 416, the method 400 returns to step 406; otherwise the method 400 proceeds to step 418.

At step 418, the battery booster 100 determines whether the task button has been pressed again. If the task button has been pressed at step 418, the method 400 proceeds to step 412; otherwise the method 400 returns to step 416.

At step 420, the battery booster 100 determines whether the task button has been pressed again. If the task button has been pressed at step 420, the method 400 returns to step 402; otherwise the method 400 returns to step 412.

As noted above, the battery booster 100 may be configured to transfer data between the power-management circuit 132 and the battery pack control circuitry 194b of the removable battery 194a via, for example, the interface 198. For example, the battery pack control circuitry 194b may employ software that controls charging and discharging of the removable battery 194a. In operation, the battery booster 100 is configured to communicate with the removable battery 194a to determine whether the removable battery 194*a* is ready for discharge by the battery booster 100. For example, the battery booster 100 and the removable battery 194*a* may exchange signals (e.g., binary high or low signal) to indicate their statuses.

In the case of the battery booster 100, the battery booster 100 may be configured to output a signal as a high (binary 1) to indicate that the battery booster 100 is attached and/or ready to receive a charge or as a low (binary 0) to indicate that the battery booster 100 is not ready to receive a charge. In the case of the removable battery 194*a*, it may be similarly configured to output a signal as a high (binary 1) indicate that the removable battery 194*a* is ready to discharge or as a low (binary 0) to indicate that the removable battery 194*a* is not ready to discharge. The removable battery 194*a* may output a signal that is low for one of multiple reasons, including, for example, inactivity, over-temperature, faults, low voltage, etc. When the removable battery 194*a* outputs a signal that is low, the battery booster 100 may output a signal that is high to attempt to wake the removable battery 194*a*. For example, if, in response, the removable battery 194*a* outputs a signal that is high, charging can continue because the removable battery 194*a* was simply inactive (as opposed to a fault). In certain aspects, the battery booster 100 may employ authentication software to authenticate the removable battery 194*a*.

Figure 5:
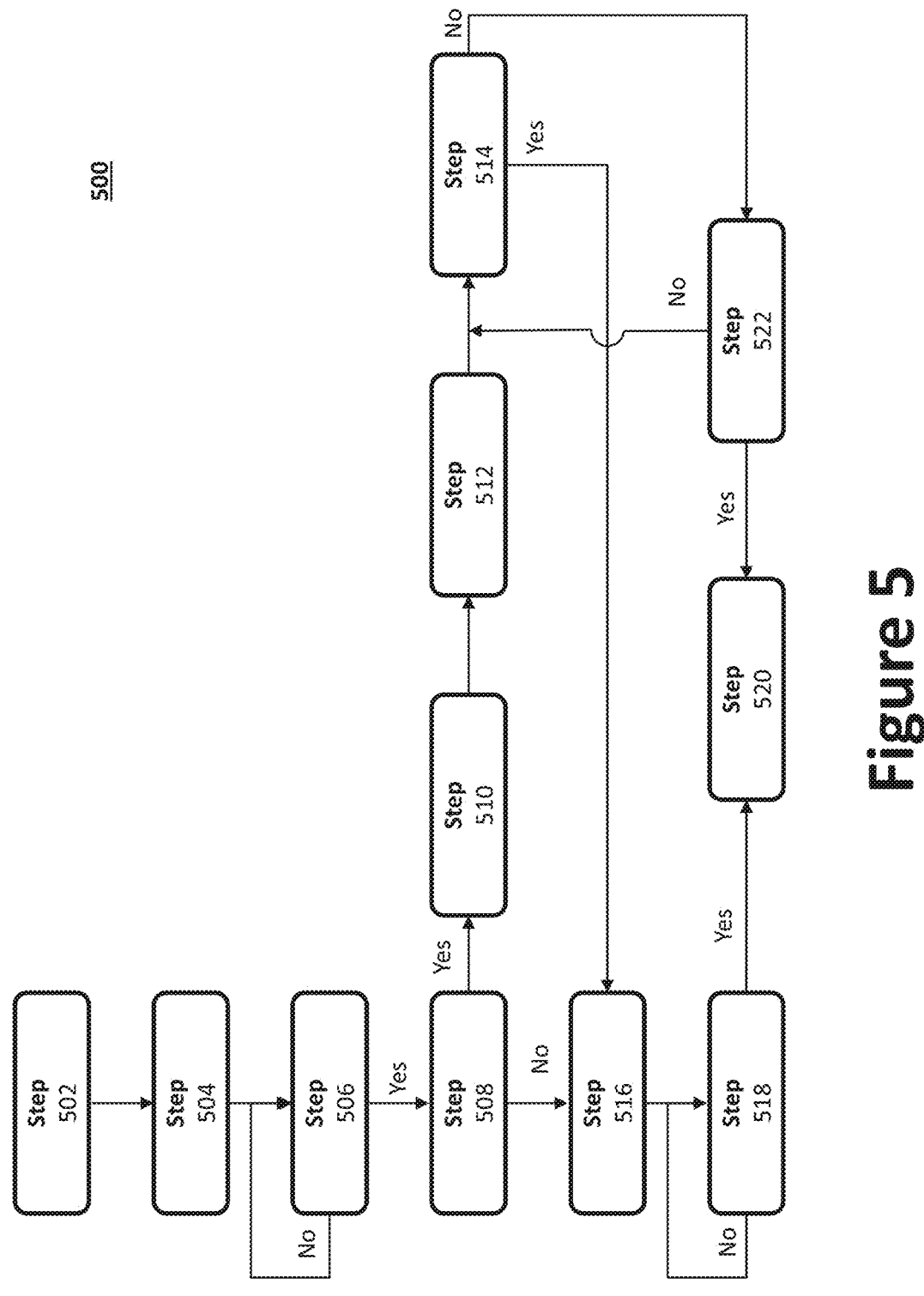
FIG. 5 illustrates a method of operating the battery booster when coupled to a removable battery in accordance with an aspect of the present disclosure.

FIG. 5 illustrates a method 500 of operating the battery booster 100 when coupled to a removable battery 194*a* in accordance with one aspect. The removable battery 194*a* may be, for example, a nominally 18-volt or 20-volt lithium power tool battery.

At step 502, the battery booster 100 is off or in a sleep mode.

At step 504, the battery booster 100 is activated, for example, turning it on or waking from a sleep mode. In some examples, the battery booster 100 may authenticate the removable battery 194*a* by determining whether or not the removable battery 194*a* is compatible and/or approved for use with the battery booster 100. For example, the battery booster 100 may communicate with the BMS of the removable battery 194*a* (e.g., the battery pack control circuitry 194*b*).

At step 506, the battery booster 100, via processor 128*a* and/or one or more sensors, determines whether the signal from the removable battery 194*a* is stable (whether at high or at low) for a first predetermined period of time. The first predetermined period of time may be, for example, 2 to 10 milliseconds, or about 5 milliseconds. If the signal from the removable battery 194*a* is stable for the predetermined period of time at step 506, the method 500 proceeds to step 508; otherwise the battery booster 100 may enter a loop until the signal is stable.

At step 508, determines whether the signal from the removable battery 194*a* is low. If the signal is low at step 508, the method 500 proceeds to step 510; otherwise the method 500 proceeds to step 516.

At step 510, the battery booster 100 outputs a signal that is high for a second predetermined period of time in an attempt to switch the signal from the removable battery 194*a* from a low to high. The second predetermined period of time may be, for example, 15 to 45 milliseconds, or about 30 milliseconds.

At step 512, the battery booster 100 starts a timer and proceeds to step 514. The timer may be for a third predetermine amount of time. The third predetermined period of time may be, for example, 50 to 150 milliseconds, or about 100 milliseconds.

At step 514, the battery booster 100 determines whether the signal from the removable battery 194*a* is high. If the signal is high at step 514, the method 500 proceeds to step 516; otherwise the method 500 proceeds to step 522.

At step 516, the battery booster 100 is started ("on") and ready for use.

At step 518, the battery booster 100 determines whether the signal from the removable battery 194*a* is low. If the signal is low at step 518, the method 500 proceeds to step 520; otherwise the battery booster 100 may enter a loop where it remains on and ready for use until the signal from the removable battery 194*a* is low (e.g., indicating a low battery, fault, etc.).

At step 520, the battery booster 100 turns off its outputs and displays an error. For example, the power-management circuit 132 can shut off or otherwise disable one or more of the DC output terminals 136 and the AC output terminals 133 via one or more switches.

At step 522, the battery booster 100 determines, via the timer, whether the third predetermine amount of time has passed. If the third predetermine amount of time has not passed, the method 500 returns to step 514. If the predetermine amount of time has passed, the method 500 proceeds to step 520.

Figure 6:
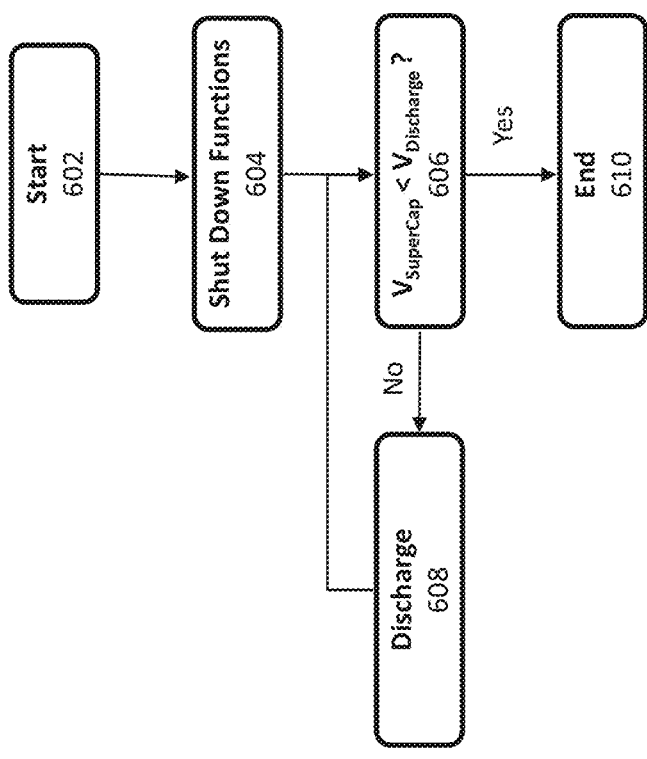
FIG. 6 illustrates a flow diagram of an example method of shutting down the battery booster in accordance with an aspect of the present disclosure.

Discharge control of supercapacitor bank 163 to maintain the voltage at an optimum voltage levels over time extends the life of the supercapacitor bank 163. FIG. 6 illustrates a method 600 of shutting down the battery booster 100 in accordance with one aspect. For example, the battery booster 100 may be turned off or entered into sleep mode.

At step 602, the method 600 is started. The method 600 may be started upon turning off the battery booster 100 or entering the battery booster 100 into a sleep mode.

At step 604, the battery booster 100 shuts off, disables, or otherwise terminates all functions, except for discharge of the supercapacitor bank 163.

At step 606, the battery booster 100 determines, via processor 128*a* and/or one or more sensors, whether the voltage ($V_{SuperCap}$) of the supercapacitor bank 163 is less than a voltage threshold ($V_{Discharge}$). If the voltage of the supercapacitor bank 163 is less than the voltage threshold, the method 600 proceeds to step 610. If the voltage of the supercapacitor bank 163 is not less than the voltage threshold, the method 600 proceeds to step 608.

The voltage threshold may be selected as a function of the rated voltage of the supercapacitor bank 163. In one example, the voltage threshold may be about 75% the rated voltage of the supercapacitor bank. For example, the voltage threshold may be about 10.5 volts where the supercapacitor bank 163 is rated at about 13.5 volts (e.g., five supercapacitors×2.7 volts each).

At step 608, the battery booster 100 discharges the supercapacitor bank 163 and returns to step 606 via supercapacitor charge controller 180 (e.g., via a discharge circuit).

At step 610, the method 600 ends and the battery booster 100 turns off or enters sleep mode.

Some modern vehicles will not attempt to start (e.g., an ignition attempt) unless the voltage of the external battery 104 is greater than the minimum voltage threshold. In some examples, this minimum voltage threshold may be between 10 and 12 volts, or about 11.5 volts. Therefore, it may be necessary to pre-charge the external battery 104 to reach the minimum voltage threshold. As noted above, the battery booster 100 may be configured to pre-charge the external battery 104 using power stored to the power bank 158. For example, power from the internal battery 160 and/or removable battery 194a may be transferred to the external battery 104.

The power available to the internal battery 160 and/or removable battery 194a may be unable to increase the voltage of the external battery 104 the minimum voltage threshold to wake up the vehicle 106. For example, a smaller internal battery 160 and/or removable battery 194a may have been used, which may have a smaller capacity. In this case, power from the supercapacitor bank 163 may be partially discharged to the vehicle 106 to wake the vehicle 106 up. As explained above, electrically coupling the supercapacitor bank 163 to a depleted external battery 104 causes the supercapacitor bank 163 to quickly discharge into the external battery 104. If this occurs before an ignition is attempted, power from the supercapacitor bank 163 will be discharged into the external battery 104 and therefore unavailable when an ignition is attempted by the vehicle 106. Therefore, power from the supercapacitor bank 163 may instead be provided to the vehicle 106 by connecting the supercapacitor bank 163 in parallel with the external battery 104 via one more switches for a short predetermined period of time. The short predetermined period of time may be sufficiently long to wake the vehicle 106, but short enough to not fully discharge the supercapacitor bank 163. Once the vehicle is awake, power from the internal battery 160 and/or removable battery 194a may be used to pre-charge the external battery 104. For example, the external battery 104 may be pre-charged by the internal battery 160 and/or removable battery 194a until a voltage threshold is reached.

Figure 7:
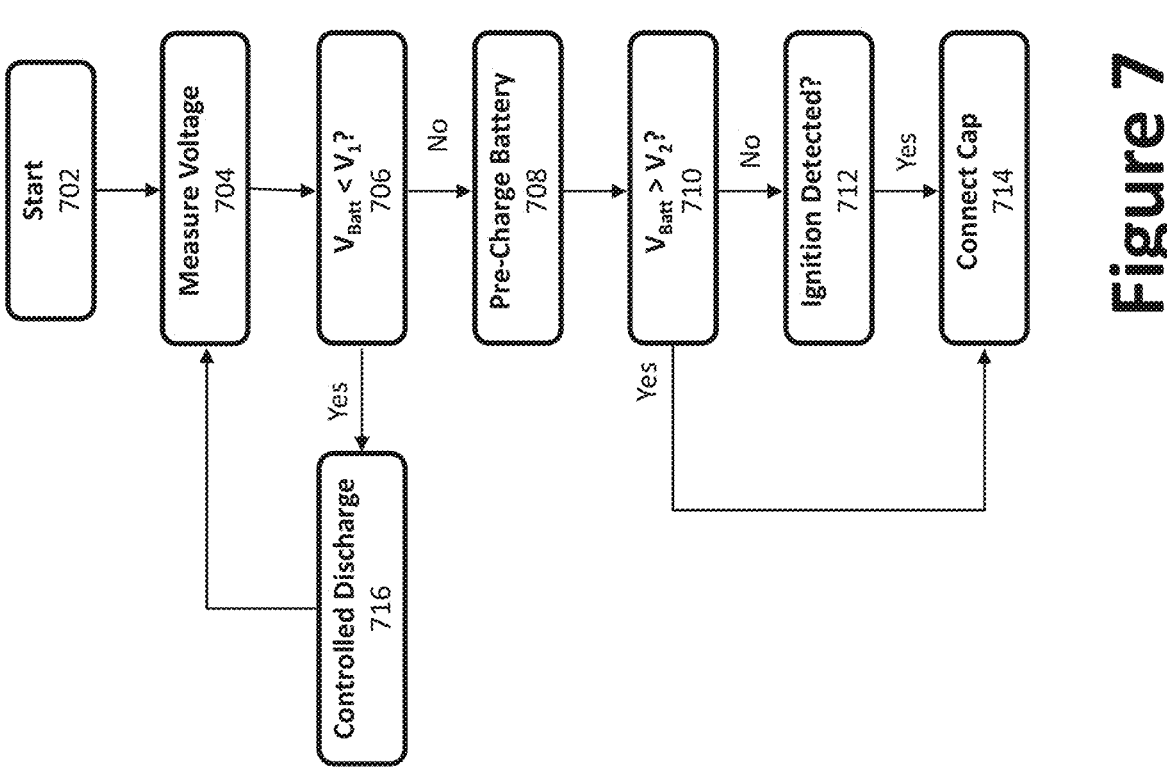
FIG. 7 illustrates a method of operating the battery booster in accordance with one aspect.

FIG. 7 illustrates a method 700 of operating the battery booster 100 in accordance with one aspect. At step 702, the method 600 is started. The method 700 may be started upon turning on the battery booster 100 or exiting the battery booster 100 from a sleep mode.

At step 704, the battery booster 100 determines, via processor 128a and/or one or more sensors, a voltage ($V_{Batt}$) of the external battery 104.

At step 706, the battery booster 100 determines, via processor 128a and/or one or more sensors, whether the voltage ($V_{Batt}$) of the external battery 104 is less than a first voltage ($V_1$). The first voltage ($V_1$) may be a minimum voltage to wake the vehicle 106, for example, between 10 and 12 volts, or about 11.5 volts. If the voltage ($V_{Batt}$) is less than the first voltage ($V_1$), the method proceeds to step 716 to perform a controlled discharge of the supercapacitor bank 163; otherwise, the method proceeds to step 708 to pre-charge the external battery 104.

At step 708, the battery booster 100 pre-charges the external battery 104 via the power bank 158 for a period of time (e.g., 1 to 10 minutes) and/or until the voltage ($V_{Batt}$) of the external battery 104 reaches a predetermined voltage (e.g., a second voltage ($V_2$)). For example, the external battery 104 can be charged using power from the internal battery 160 and/or removable battery 194a.

At step 710, the battery booster 100 determines, via processor 128a and/or one or more sensors, whether the voltage of the vehicle battery ($V_{Batt}$) is greater than a second voltage ($V_2$). The second voltage ($V_2$) may be selected as a function of the voltage of the supercapacitor bank 163 ($V_{SuperCap}$). For example, the battery booster 100 may measure a voltage ($V_{SuperCap}$) of the supercapacitor bank 163. In one example, if the second voltage ($V_2$) may be equal to, or about equal (e.g., within a 10% deviation), of the voltage ($V_{SuperCap}$) of the supercapacitor bank 163. In another example, the second voltage ($V_2$) may be equal to the first voltage ($V_1$). If the voltage ($V_{Batt}$) is greater than the second voltage ($V_2$), the method proceeds to step 714; otherwise, the method proceeds to step 712.

At step 712, the battery booster 100 determines, via processor 128a and/or one or more sensors, whether an ignition attempt is occurring (or has occurred). The ignition attempt may be determined by monitoring for a sudden voltage drop at the vehicle 106 (e.g., across the battery clamps 168), which indicates an operator is attempting to start the vehicle 106. Upon detecting an ignition attempt, the method proceeds to step 714.

At step 714, the battery booster 100 connects the supercapacitor bank 163 to the vehicle 106 in parallel with the external battery 104 via one more switches (e.g., of the power output controller 182).

At step 716, the battery booster 100 performs a controlled discharge of power from the supercapacitor bank 163 to the vehicle 106 by connecting the supercapacitor bank 163 in parallel with the external battery 104 via one more switches for a short predetermined period of time (e.g., 1 to 3 seconds, or about 5-20 milliseconds) to wake the vehicle 106.

As noted above, the power-management circuit 132 and processor 128a may facilitate various safety features, such as reverse hook-up protection, battery detection, etc. For example, the processor 128a may control the boost switch 191 based on sensor readings received from one or more sensors or sensing circuits. In some examples, the processor 128a may close the boost switch 191 only upon receiving a signal that the battery is connected, a signal that the battery is connected with the correct polarity, etc. In other examples, however, certain functionality and protections may be provided through circuitry (e.g., a hard-wired approach) without necessitating use of the processor 128a and/or software.

Figure 8A:
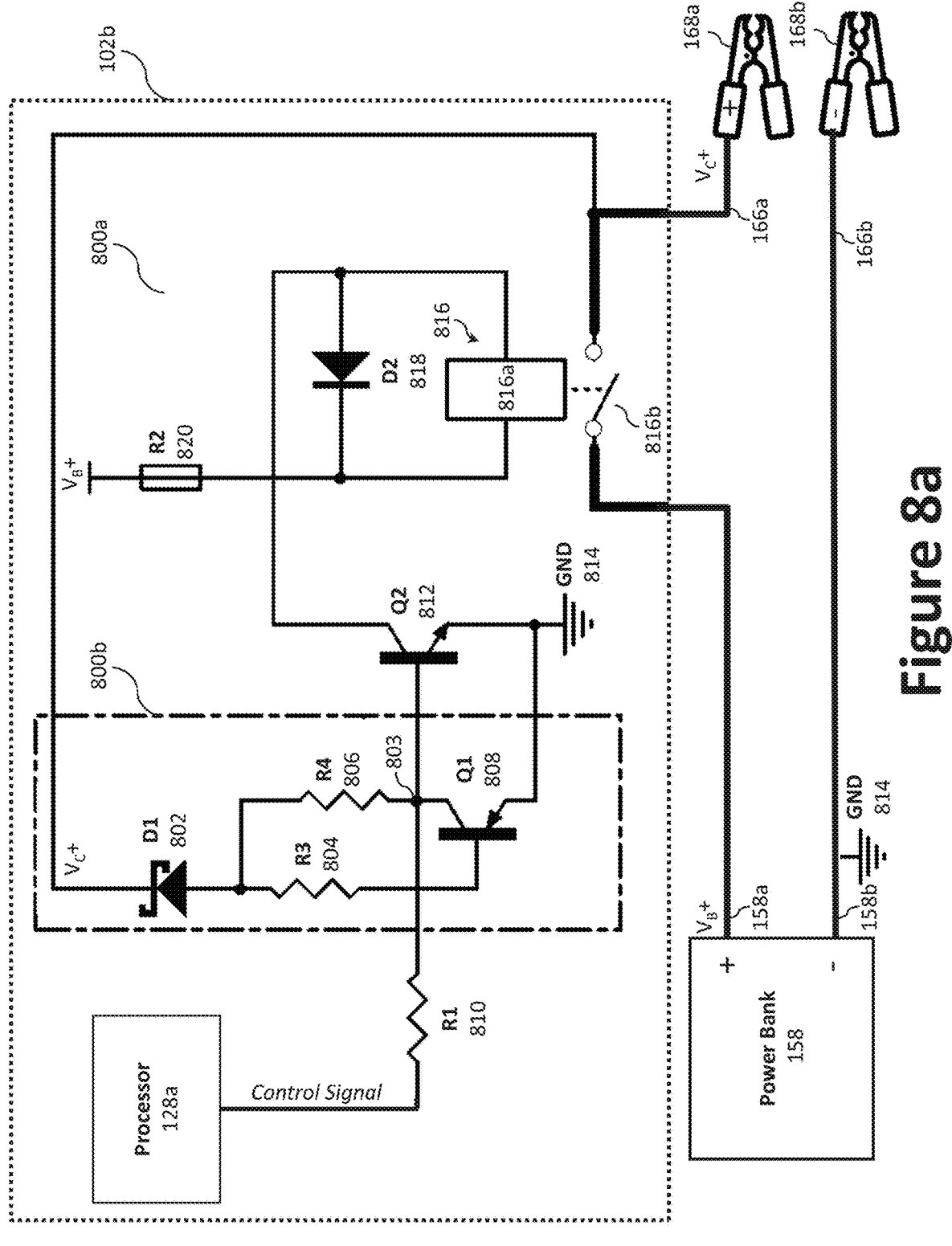
FIG. 8a illustrates an example relay control circuit with reverse polarity protection circuit.

FIG. 8a illustrates an example relay control circuit 800a and reverse polarity protection circuit 800b configured for use with a battery booster 100. The relay control circuit 800a and reverse polarity protection circuit 800b may be provided as part of the power output controller 182 and/or housed in the second housing 102b. In operation, the relay control circuit 800a controls the mechanical relay 816 (or another boost switch 191) using a relay (RLY) control signal from the processor 128a, while the reverse polarity protection circuit 800b serves to, in effect, intercept the RLY control signal if the external battery 104 is connected in reverse. While various transistors and relays are illustrated as example switches in FIGS. 8a through 8e, other types of switches may be employed. In this example, the boost switch 191 is a mechanical relay 816, though other types of switches are contemplated, including, for example, solid-state switches. Rather than use the processor 128a to control the mechanical relay 816 as a function of a detected polarity, the separate reverse polarity protection circuit 800b provides a robust, hard-wired solution to, in effect, override the RLY control signal from the processor 128a when the external battery 104 is connected in reverse. Further, those of skill in the art would appreciate from the subject disclosure that the various component values (e.g., resistor values, capacitor values, etc.) may be adjusted to achieve a desired need, voltage, etc.

The relay control circuit 800a is used to control operation of the mechanical relay 816 based on a RLY control signal from the processor 128a. Under normal operation, the processor 128a generates the RLY control signal if one or more conditions are met. For example, the processor 128a may determine that the battery clamps 168 are connected to an external battery 104 by measuring a voltage of the external battery 104. Once the processor 128a has determined that the battery clamps 168 are connected to the external battery 104 or the vehicle 106 is otherwise ready to jump starting, the processor 128a outputs a RLY control signal to close the boost switch 191.

As illustrated, the relay control circuit 800a generally comprises a first resistor (R1) 810, a second resistor (R2) 820, a transistor (Q2) 812, and a diode (D2) 818 electrically in parallel with the mechanical relay 816. In operation, the mechanical relay 816 is controlled in response to the RLY control signal from the processor 128a via the first resistor (R1) 810. For example, the processor 128a selectively outputs the RLY control signal to open and close the electrical connection between the positive terminal of the power bank 158 and the positive clamp 168a using power ($V_B$+) from the power bank 158. While illustrated on the positive terminal of the power bank 158, the mechanical relay 816 may instead be provided on the negative terminal of the power bank 158 before the negative clamp 168b.

In one example, the solenoid 816a of the mechanical relay 816 is electrically connected in parallel with the diode (D3) 818. One end (e.g., a first lead) of the solenoid 816a (and the cathode of the diode (D3) 818) receives power ($V_B$+) from the power bank 158 via the second resistor (R2) 820, while the other end (e.g., a second lead) of the solenoid 816a (and the anode of the diode (D3) 818) is coupled to the collector of the transistor (Q2) 812. In this example, the power ($V_B$+) is used to energize the solenoid 816a of the mechanical relay 816 to thereby close the switch 816b. More specifically, the RLY control signal from the processor 128a is fed to the base of the transistor (Q2) 812 via a resistor (R3) 810 to control the transistor (Q2) 812. The RLY control signal at the base of the transistor (Q2) 812 causes the transistor (Q2) 812 to close (i.e., enter a conducting state). As illustrated, the emitter of the transistor (Q2) 812 is connected to ground (GND) 814. When the transistor (Q2) 812 is closed, the collector of the transistor (Q2) 812 is therefore connected to ground (GND) 814, thus completing the circuit through the solenoid 816a and activating the switch 816b of the mechanical relay 816.

In the event the external battery 104 is connected in reverse, the reverse polarity protection circuit 800b serves to intercept the RLY control signal, thereby disabling the processor's 128a ability to control the mechanical relay 816. As illustrated, the reverse polarity protection circuit 800b can be electrical positioned between the first resistor (R1) 810 and the transistor (Q2) 812. In the illustrated example, the reverse polarity protection circuit 800b generally comprises a diode (D1) 802, a third resistor (R3) 804, a fourth resistor (R4) 806, and a transistor (Q1) 808. The cathode of the diode (D1) 802 is connected to the positive clamp 168a, which, when connected properly, is connected to the positive terminal ($V_C$+) of the external battery 104. The anode of the diode (D1) 802 is connected to a lead (e.g., a conductor) of each of the third resistor (R3) 804 and the fourth resistor (R4) 806. The other lead of the third resistor (R3) 804 is connected to the base of the transistor (Q1) 808. In other words, current passing through the third resistor (R3) 804 is used to activate and deactivate the transistor (Q1) 808. The other lead of the fourth resistor (R4) 806 is connected, via a node 803, to both the collector of the transistor (Q1) 808 and to the base of the transistor (Q2) 812. The emitter of the transistor (Q1) 808 is, in turn, connected to ground (GND) 814.

When the external battery 104 is connected improperly (i.e., the positive clamp 168a is connected to the negative terminal of the external battery 104), transistor (Q1) 808 is closed and, therefore, the base of the transistor (Q2) 812 is connected to ground (GND) 814 via transistor (Q1) 808 (and node 803). When the base of the transistor (Q2) 812 is connected to ground (GND) 814, the RLY control signal is grounded and, therefore, unable to control transistor (Q2) 812. The reverse polarity protection circuit 800b, in effect, locks transistor (Q2) 812 in an open position such that the mechanical relay 816 cannot be controlled by the processor 128a. In some examples, each of the first resistor (R1) 810, the second resistor (R2) 820, the third resistor (R3) 804, and the fourth resistor (R4) 806 are rated 1 kΩ. The transistors (808 Q1, 812 Q2) may be, for example, bipolar (BJT) transistor constructed by sandwiching an N-type semiconductor between two P-type semiconductors. The diode (D1) 802 and/or diode (D2) 818 may be, for example, a Schottky diode, a silicon epitaxial planar diode, etc.

In some examples, it is advantageous to provide over-voltage protection to prevent or mitigate damage to the vehicle 106 in the event of an over-voltage condition. That is, the onboard computers, circuitry, and/or other electronics of a modern vehicle 106 can be damaged by exceedingly high voltage spikes. Therefore, it may be advantageous to control the mechanical relay 816 as a function of the voltage ($V_B$+) of the power bank 158. Specifically, if the voltage ($V_B$+) of the power bank 158 exceeds a preset voltage level, the mechanical relay 816 is opened to prevent power transfer between the power bank 158 and the vehicle 106. By way of illustration, many vehicles 106 operate with an external battery 104 having a nominal voltage of 12 volts and can typically operate at 13.7 to 14.7 volts (e.g., when the vehicle 106 is running); however, some vehicles 106 may not be able to tolerate voltage spikes above 15 volts, for example. To that end, an overvoltage condition may occur for such vehicles 106 when, for example, the voltage ($V_B$+) of the power bank 158 exceeds 15 or 16 volts, though other preset voltage levels are contemplated depending on the type of vehicle 106.

In some examples, over-voltage protection may be achieved by slightly undercharging the power bank 158, such as the case where the nominal voltage of the power bank 158 is greater than that of the external battery 104 or otherwise exceeds a maximum voltage for the vehicle 106. For example, in the case of a power bank 158 having a 16-volt nominal voltage, the power bank 158 may be charged a lesser voltage (e.g., 15.5V, 16V, etc.) rather than a fully charged voltage, which is typically greater than 16 volts. Undercharging the power bank 158 would allow for the power bank 158 to already below the maximum over-voltage of the vehicle 106. Additionally or alternatively, an over-voltage protection circuit may be employed to provide over-voltage protection, examples of which are illustrated in FIGS. 8b through 8e.

Figure 8B:
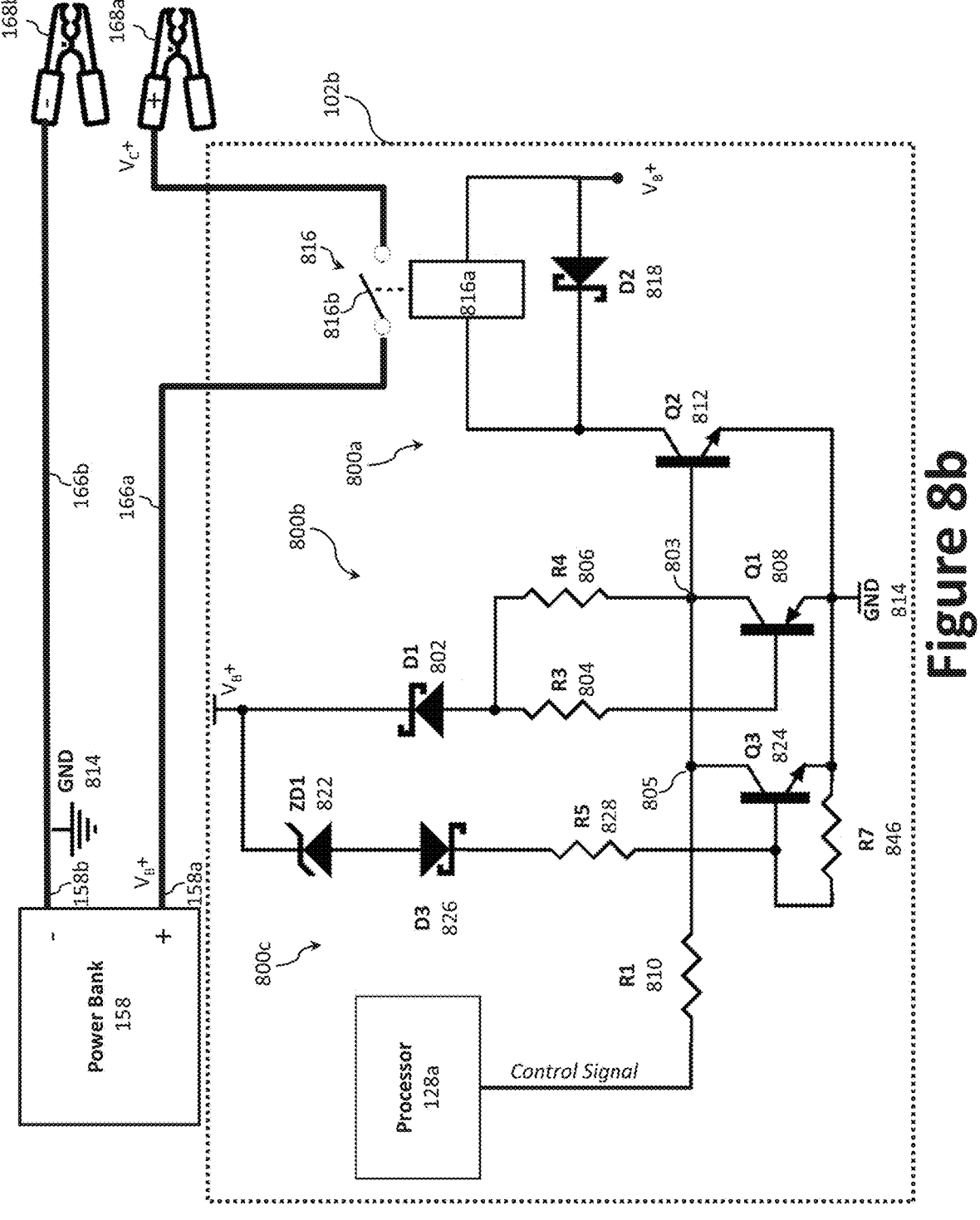
FIG. 8b illustrates an example relay control circuit with reverse polarity protection circuit and over-voltage protection in accordance with one aspect.

FIG. 8b illustrates an example relay control circuit 800a with both a reverse polarity protection circuit 800b and an over-voltage protection circuit 800c in accordance with one aspect. The relay control circuit 800a and the reverse polarity protection circuit 800b operate in substantially the same manner as described above in connection with FIG. 8a, but the design further comprises an over-voltage protection circuit 800c. In the illustrated example, the over-voltage protection circuit 800c comprises a zener diode (ZD1) 822, a transistor (Q3) 824, a diode (D3) 826, and a resistor (R5) 828 configured to disable the mechanical relay 816 in the event of an over-voltage condition. In some examples, the resistor (R5) 828 is rated 10 kΩ, resistor (R7) 846 is rated 100 kΩ, and the zener diode (ZD1) 822 may be a high-speed zener diode rated at, for example, 15 volts; though other voltages are contemplated depending on the desired preset voltage level. The transistor (Q3) 824 may be, for example, a BJT and the diode (D3) 826 may be, for example, a Schottky diode, a silicon epitaxial planar diode, etc.

When no overvoltage condition exists, transistor (Q3) 824 is open and, therefore, the node 805, which electrically coincides with node 803, is disconnected from ground (GND) 814. In the event of an overvoltage condition, the zener diode (ZD1) 822 and the resistor (R5) 828 pass a voltage to the base of transistor (Q3) 824, thereby closing the gate of transistor (Q3) 824 and connecting the node 805 to ground (GND) 814 via transistor (Q3) 824. As a result of grounding node 805 (as with node 803), the base of the transistor (Q2) 812 is electrically connected to ground (GND) 814 via transistor (Q1) 808 (and nodes 803/805). When the base of the transistor (Q2) 812 is connected to ground (GND) 814, the RLY control signal is grounded and, therefore, unable to control transistor (Q2) 812. The diode (D3) 826 operates to prevent backflow of power.

Figure 8C:
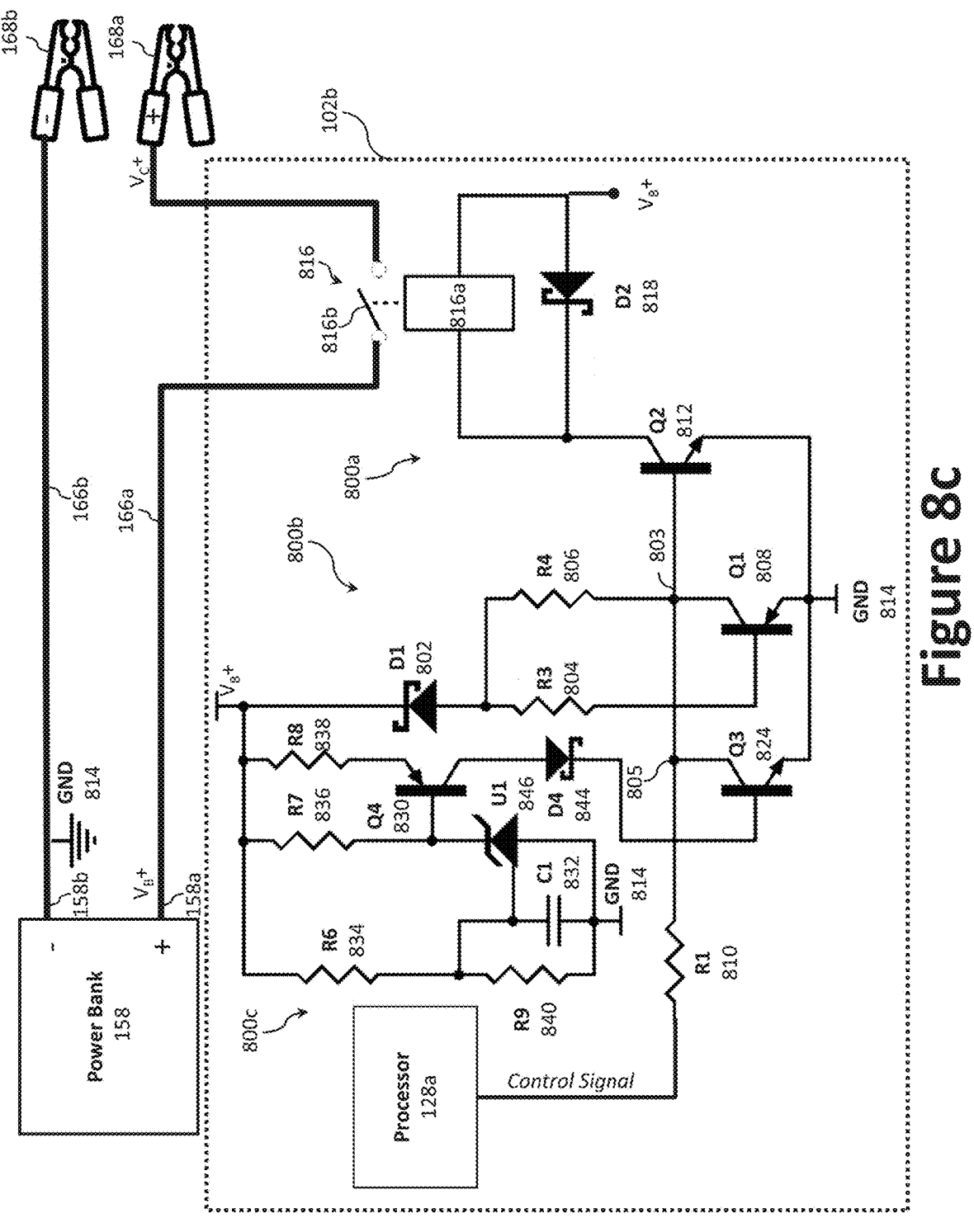
FIG. 8c illustrates an example relay control circuit with reverse polarity protection circuit and over-voltage protection in accordance with another aspect.

FIG. 8c illustrates another example relay control circuit 800a with both a reverse polarity protection circuit 800b and an over-voltage protection circuit 800c in accordance with another aspect. The relay control circuit 800a and the reverse polarity protection circuit 800b operate in substantially the same manner as described above in connection with FIG. 8a, but the design further comprises an over-voltage protection circuit 800c configured to disable the mechanical relay 816 in the event of an over-voltage condition in accordance with another aspect. In the illustrated example, the over-voltage protection circuit 800c comprises a shut regular (U1) 846, transistors (Q3) 824 & (Q4) 830, a capacitor (C1) 832, and resistors (R6) 834, (R7) 836, (R8) 838, & (R9) 840. A benefit of the over-voltage protection circuit 800c is that it can be tuned for different preset voltage levels (e.g., 15V, 15.5V, 16V, etc.) based on the values for resistors (R6) 834 and (R9) 840 and timing controlled with capacitor (C1) 832. When the shunt regulator (U1) 846 detects the over-voltage, it allows the base of transistor (Q4) 830 to become low, which in turn allows the base of transistor (Q3) 824 to be pulled high; thus, overriding the control signal of 128a and turning off the transistor (Q2) 812 that controls the mechanical relay. In some examples, the shut regular (U1) 846 may be, for example, a three-terminal adjustable shunt regulator (e.g., IC part number AZ431A) and the capacitor (C1) 832 is rated 1 nF, while resistor (R6) 834 can be rated 59 kΩ and each of the resistor (R7) 836 and the second resistor (R8) 838 can be rated 10 kΩ. The diode (D4) 844 may be, for example, a Schottky diode.

Figure 8D:
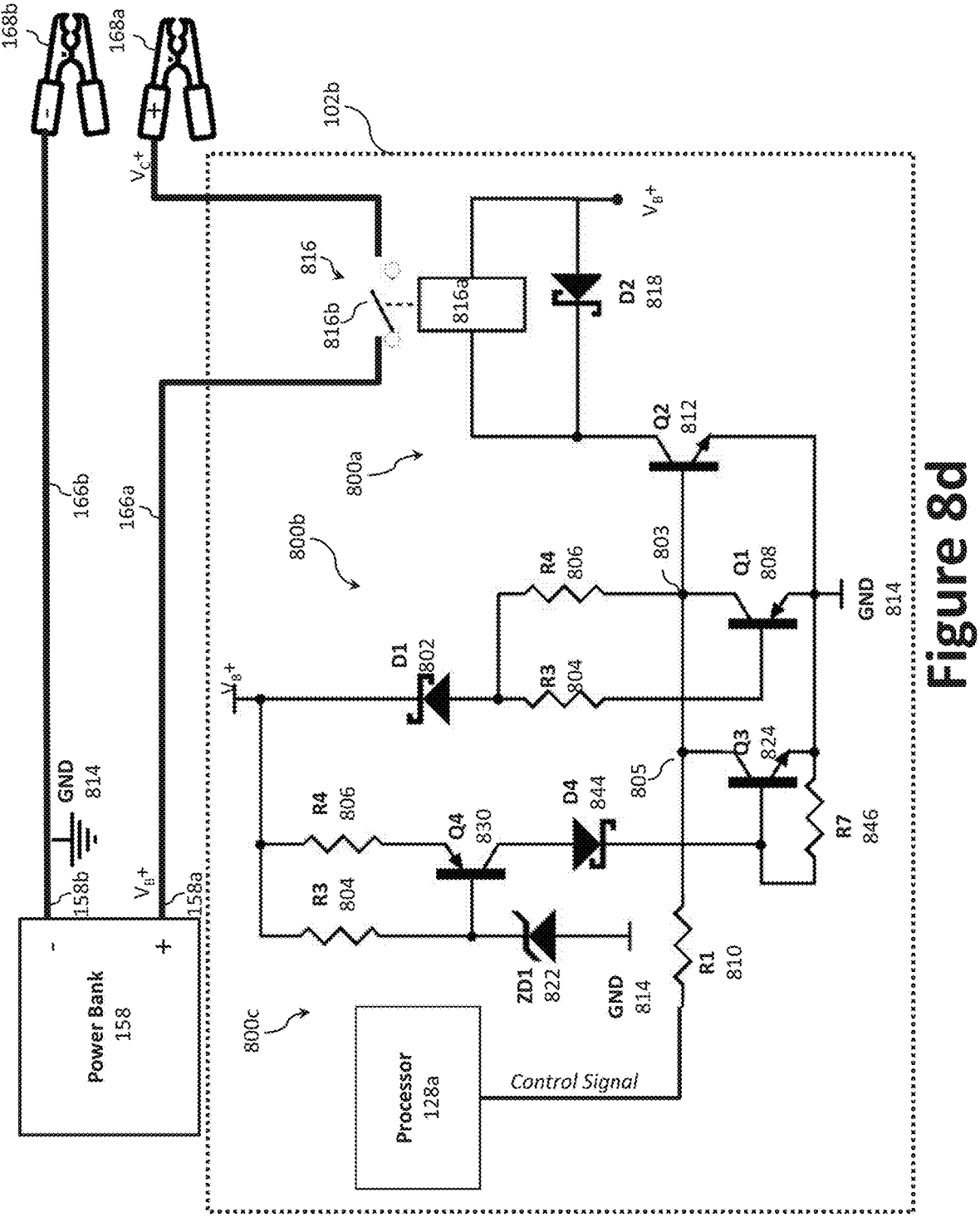
FIG. 8d illustrates an example relay control circuit with reverse polarity protection circuit and over-voltage protection in accordance with yet another aspect.

FIG. 8d illustrates another example relay control circuit 800a with both a reverse polarity protection circuit 800b and an over-voltage protection circuit 800c in accordance with yet another aspect. The relay control circuit 800a, the reverse polarity protection circuit 800b, and over-voltage protection circuit 800c operate in substantially the same manner as described above in connection with FIG. 8b, but a diode (D4) 844 is added to provide an extra 0.2V drop to achieve the preset voltage level (e.g., a 16V threshold) and to compensate the positive temperature coefficient of the zener diode (ZD1) 822.

Figure 8E:
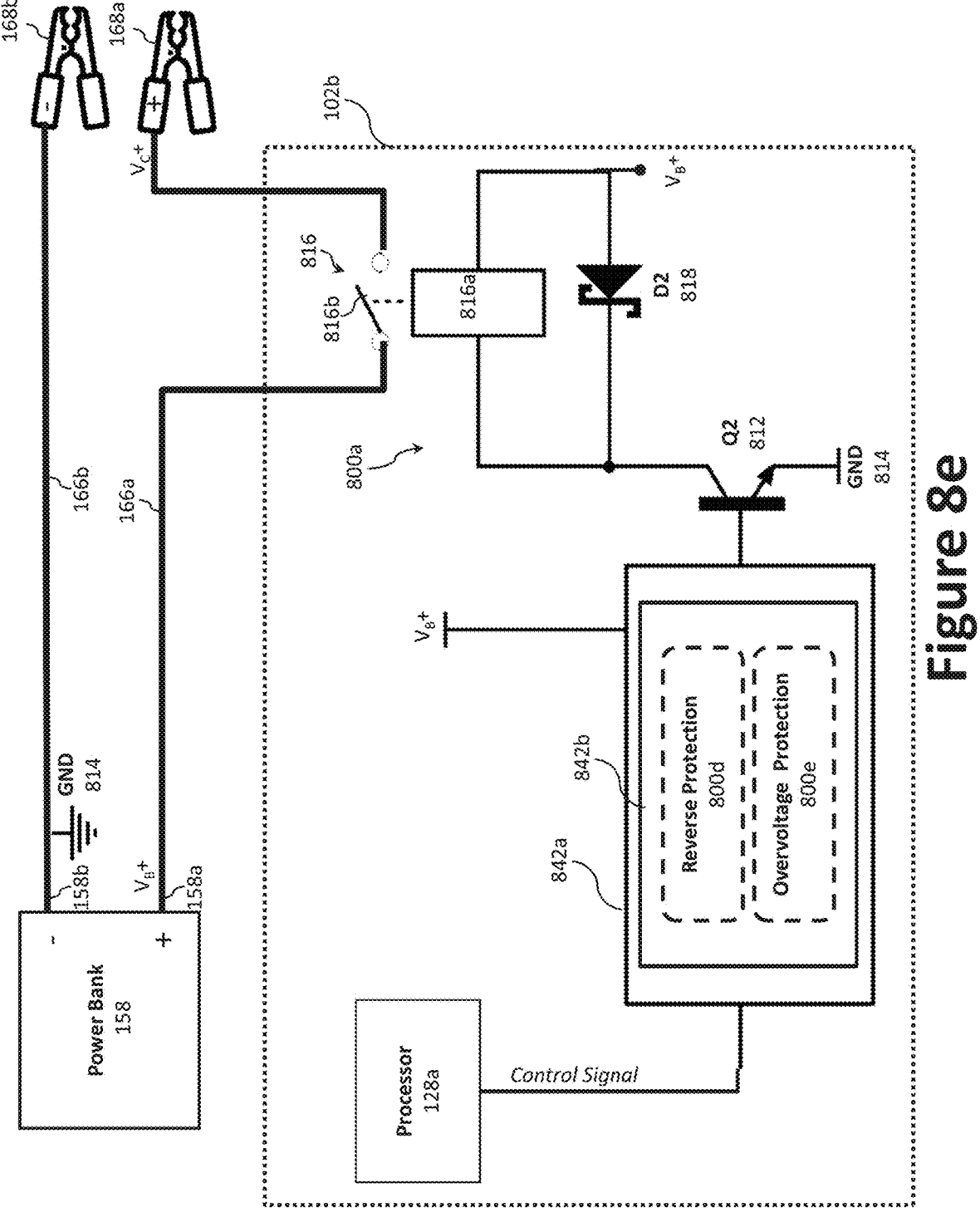
FIG. 8e illustrates an example relay control circuit with reverse polarity protection circuit and over-voltage protection in accordance with yet another aspect.

FIG. 8e illustrates an example relay control circuit 800a with reverse polarity protection software module 800d and over-voltage protection software module 800e in accordance with yet another aspect. While FIGS. 8a through 8c describe various hardware designs to disable the transistor (Q2) 812 in the event of reverse polarity and over-voltage conditions, the functionality may instead be implemented using software stored to the memory device 128b based on inputs reflecting a measured voltage of the power bank 158 and/or a measured voltage across the clamps 168 (i.e., positive clamp 168a, negative clamp 168b). The reverse polarity protection software module 800d and over-voltage protection software module 800e may be implemented by a processor 842a using machine executable instructions stored to a memory device 842b. While the processor 842a and the memory device 842b are illustrated as being separate and apart from the processor 128a and memory device 128b, it is contemplated that one or both of the processor 128a and the memory device 128b can serve as the processor 842a and/or the memory device 842b, if desired.

In operation, the processor 842a is configured to control the transistor (Q2) 812 based upon the inputs. For example, when the external battery 104 is connected improperly (i.e., the positive clamp 168a is connected to the negative terminal of the external battery 104), a negative voltage is measured across the clamps 168 and the processor 842a can the prohibit the RLY control signal from passing to the transistor (Q2) 812 by, for example, grounding the base of the transistor (Q2) 812. Likewise, when the voltage ($V_B$+) of the power bank 158 exceeds a preset voltage level (e.g., 15 volts), the processor 842a can prohibit the RLY control signal from passing to the transistor (Q2) 812. When the base of the transistor (Q2) 812 is connected to ground (GND) 814, the RLY control signal is unable to control transistor (Q2) 812.

Lithium batteries, such as those used in connection with the power bank 158, are known to have reduced performance when operated at lower temperatures. In the example of the internal battery 160, the internal battery 160 may supply an amount of current to the external battery 104, which would both pre-charge the external battery 104 and increase the temperature of the internal battery 160. In another example, heat can be applied to the internal battery 160 from an external source. Resistive heaters may be used an external source, but such resistive heaters typically require either a thermostat or electronic sensor to sense and maintain a constant temperature by switching the resistive heaters on and off. The battery type, conditions, and ambient temperatures will affect the control.

Figure 9:
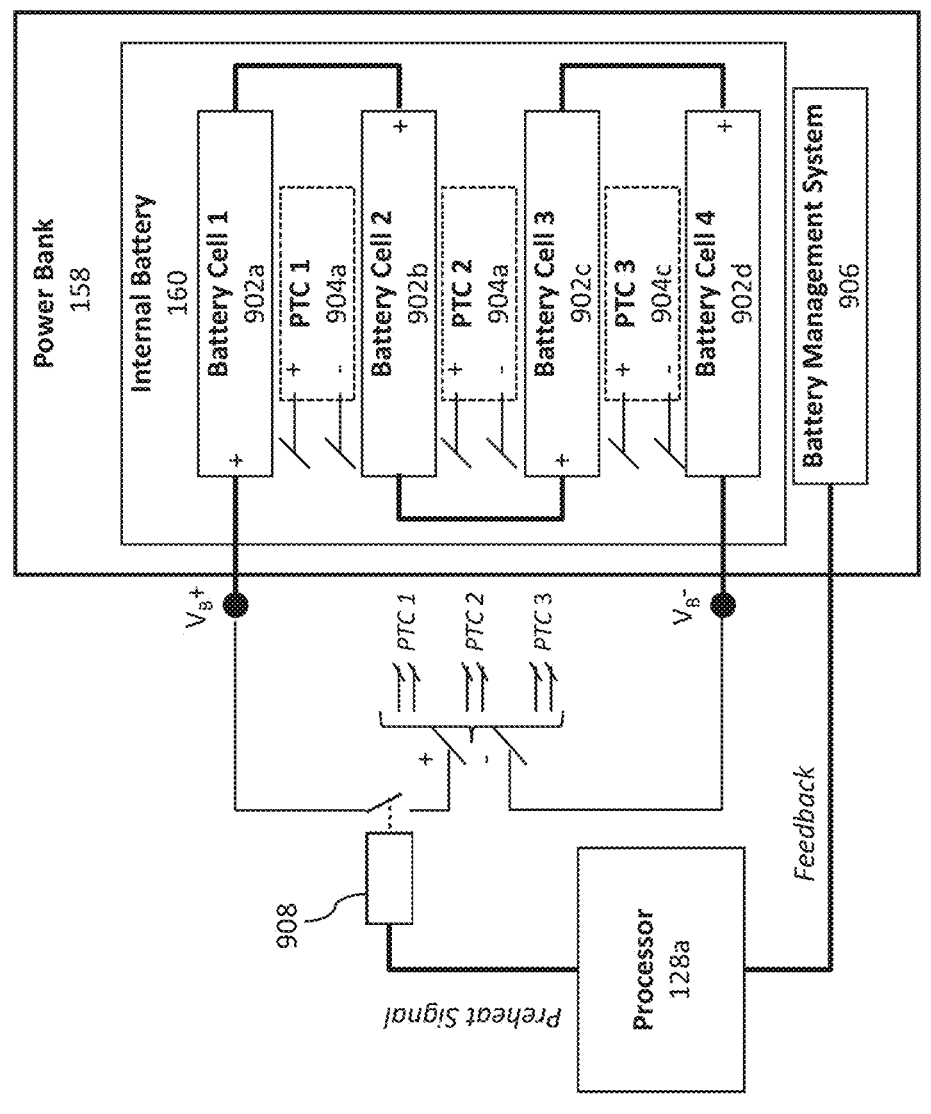
FIG. 9 illustrates an example preheat circuit in accordance with an aspect of the present disclosure.

FIG. 9 illustrates an example preheat circuit 900 in accordance with an aspect of the present disclosure. As illustrated, the internal battery 160 comprises one or more battery cells 902 that can be connected in series (as illustrated) and/or in parallel. The internal battery 160 is illustrated with four battery cells 902a, 902b, 902c, 902d; however, additional or fewer battery cells 902 may be employed to achieve a desired nominal voltage and capacity. Further, while the preheat circuit 900 of FIG. 9 is described in connection with the internal battery 160, the preheat circuit 900 and associated techniques may similarly applied to other batteries in the battery booster 100, such as the removable battery 194a or even the external battery 104 (e.g., when a lithium starter battery is used).

In the illustrated example, the preheat circuit 900 comprises one or more positive temperature coefficient (PTC) heaters 904 and a switch 908. The one or more PTC heaters 904 may be coupled electrically to one another in parallel. The use of one or more PTC heaters 904 set for a low curie temperature compatible with lithium chemistry batteries obviates the need for the above-mentioned thermostats and electronic sensors, thus only needing a switch 908 to connect the internal battery 160 to the one or more PTC heaters 904. The PTC heater 904 is a self-regulating heaters that run open-loop without requiring external diagnostic controls. While traditional fixed-resistance heaters employ wires and coils to generate heat, PTC heater 904 can use conductive inks printed on thin, flexible polymer-based substrates. The properties of the material allow the PTC heater 904 to act as its own sensor, eliminating the need for any external feedback controls. As a result, the heater eliminates the risk of overheating. For example, PTC heaters 904 utilize PTC materials—materials that exhibit a positive resistance change in response to the increase in temperature. As the temperature increases, the electrical resistance of the material also increases, thus limiting the current flow. Accordingly, a secondary control thermostat is not required. The PTC heater 904 self-regulates the temperature—if colder than the set temperature, current from the battery is increased. Current is decreased as temperature approaches the PTC curie temperature. The PTC heaters 904 are capable of using the internal battery 160 as the power source. Additionally, a wide range of voltages from 12V (3 cells) up to 32V (8 cells) has minimal effect on the PTC temperature.

The illustrated PTC heaters 904 (e.g., PTC 1 904a, PTC 2 904b, PTC 3 904c) are sandwiched between adjacent battery cells 902 (e.g., battery cells 902a, 902b, 902c, 902d) to allow heat conduction to all battery cells 902 in the cell stack of the internal battery 160; however, the PTC heaters 904 may instead be positioned on the outside of the cell stack. For example, the battery cells 902a, 902b, 902c, 902d may stack on top of one another to form a cell stack and a PTC heater 904 may be positioned external to the cell stack (e.g., in contact with one or both of the outermost battery cells 902a, 902d).

A switch 908 is used to turn the PTC heaters 904 on and off. The switch 908 is controlled by processor 128a, which in turn may be operably coupled to the battery management system (BMS) 906 of the internal battery 160. The switch 908 may be an electromechanical switch or a solid-state switch that can be controlled by a processor 128a. Optional use of the BMS 906 could provide a signal to the microprocessor to turn the switch "on" (i.e., closing the switch) if detected the battery is at a cold temperature and to turn the switch "off" (i.e., opening the switch) when at a nominal temperature, but the BMS 906 is not needed to regulate the temperature of the heater. The processor 128a could also use a timer to turn the switch 908 "on" and "off".

A battery booster 100 for jumpstarting a vehicle 106 having an external battery 104, the battery booster 100 comprising: a set of electrical conductors 166 configured to couple with the external battery 104 or with an engine that is electrically coupled with the external battery 104 via a set of battery clamps 168, a power supply 158, a boost switch 191, and a processor 128a. The set of electrical conductors 166 comprise a positive electrical conductor 166a and a negative electrical conductor 166b. The power supply 158 configured to supply a starting current to jump start the vehicle 106 via the set of electrical conductors 166. The power supply 158 may comprise a plurality of lithium battery cells 902 arranged to form a lithium battery 160, 194a having a positive terminal 158a and a negative terminal 158b. The boost switch 191 is positioned in-line between the power supply 158 and the set of battery clamps 168 on one of the set of electrical conductors 166. The at least one processor 128a configured to output a control signal to close the boost switch 191 as a function of one or more parameters of the power supply 158, the external battery 104, or the vehicle 106.

In some examples, the battery booster 100 further comprises a relay control circuit 800a configured to control the boost switch 191. The boost switch 191 may be a mechanical relay 816 having a switch 816b controlled by a solenoid 816a, the solenoid 816a having a first lead and a second lead. The relay control circuit 800a comprises a transistor 812 configured to actuate the solenoid 816a via the positive terminal 158a and the negative terminal 158b. In some examples, the solenoid 816a is connected to the positive terminal 158a via the first lead, and the transistor 812 comprises an emitter connected to the negative terminal 158b, a base configured to receive the control signal, and a collector coupled to the solenoid 816a via the second lead. In some examples, in response to the control signal, the transistor 812 electrically connects the negative terminal 158b with the second lead, thereby actuating the solenoid 816a and closing the switch 816b. In some examples, the battery booster 100 further comprises a reverse polarity protection circuit 800b configured to disable the transistor 812 when the set of battery clamps 168 are connected to the vehicle 106 in a reverse polarity configuration.

In some examples, the reverse polarity protection circuit 800b comprises a second transistor 808 configured to connect the base of the transistor 812 to the negative terminal 158b. In some examples, the battery booster 100 further comprises an over-voltage protection circuit 800c configured to disable the transistor 812 when a voltage of the power supply 158 exceeds a preset voltage level. In some examples, the over-voltage protection circuit 800c comprises a zener diode 822 and a third transistor 824 configured to connect the base of the transistor 812 to the negative terminal 158b. In some examples, the power supply 158 comprises an internal heater 199 to heat the power supply 158 or a portion thereof. In some examples, the internal heater 199 is a positive temperature coefficient PTC heater 904. In some examples, the PTC heater 904 is positioned between two of said plurality of lithium battery cells 902. In some examples, the PTC heater 904 is powered by the lithium battery 160, 194a. In some examples, the lithium battery 160, 194a is a removable battery 194a. In some examples, the removable battery 194a is a power tool battery and the battery booster 100 is configured to authenticate the power tool battery. In some examples, the power tool battery has a nominal voltage of 18 volts to 20 volts. In some examples, the power supply 158 further comprises a supercapacitor bank 163 that is coupled in parallel with the lithium battery 160, 194a. In some examples, the battery booster 100 is configured to charge the supercapacitor bank 163 to a charge voltage that is greater than a rated voltage of the supercapacitor bank 163. In some examples, the charge voltage is at least 10 percent higher than the rated voltage.

In some examples, the battery booster 100 is configured maintain the supercapacitor bank 163 at the charge voltage for a predetermined amount of time before discharging the supercapacitor bank 163 until a measure voltage of the supercapacitor bank 163 is less than or equal to the rated voltage. In some examples, the supercapacitor bank 163 is configured to discharge into the lithium battery 160, 194a.

In some examples, the predetermined amount of time is 1 minute or less. In some examples, the battery booster 100 further comprises a DC output 136 configured to supply power to a portable electronic device 152, wherein the least one processor 128a is configured to disable the DC output 136 when a current draw at the DC output 136 is greater than a first predetermined current. In some examples, the first predetermined current is 2.1 amps. In some examples, the least one processor 128a is further configured to disable the DC output 136 when the current draw at the DC output 136 is not greater than a second predetermined current after a predetermined amount of time. In some examples, the second predetermined current is 50 mA. In some examples, the battery booster 100 further comprises one or more coils 135 positioned in or on a housing 102 of the battery booster 100 and configured to transmit wireless power. In some examples, the battery booster 100 is configured to charge a portable electronic device 152 via the one or more coils 135. In some examples, the battery booster 100 is configured to charge the portable electronic device 152 in accordance with the Qi standard.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A battery booster for jumpstarting a vehicle having an external battery, the battery booster comprising:
   a set of electrical conductors configured to couple with the external battery or with an engine electrically coupled with the external battery via a set of battery clamps,
   wherein the set of electrical conductors comprises a positive electrical conductor and a negative electrical conductor;
   a power supply configured to supply a starting current to jump start the vehicle via the set of electrical conductors,
   wherein the power supply comprises a plurality of lithium battery cells arranged to form a lithium battery having a positive terminal and a negative terminal;
   a boost switch positioned in-line between the power supply and the set of battery clamps on one of the set of electrical conductors,
   wherein the boost switch is a mechanical relay having a switch controlled by a solenoid, the solenoid having a first lead and a second lead;
   a control circuit configured to control the boost switch,
   wherein the control circuit comprises a transistor configured to actuate the solenoid using power drawn from the positive terminal or the negative terminal; and
   at least one processor configured to output a control signal to close the boost switch as a function of one or more parameters of the power supply, the external battery, or the vehicle.

2. The battery booster of claim 1, wherein the power supply comprises a positive temperature coefficient (PTC) heater positioned between two of said plurality of lithium battery cells, wherein the PTC heater is configured to heat the power supply or a portion thereof.

3. The battery booster of claim 1, wherein the solenoid is connected to the positive terminal by the first lead, and the transistor comprises an emitter connected to the negative terminal, a base configured to receive the control signal, and a collector coupled to the solenoid by the second lead.

4. The battery booster of claim 3, wherein, in response to the control signal, the transistor electrically connects the negative terminal with the second lead, thereby actuating the solenoid and closing the switch.

5. The battery booster of claim 4, further comprising a reverse polarity protection circuit configured to disable the transistor when the set of battery clamps is connected to the external battery in a reverse polarity configuration.

6. The battery booster of claim 5, wherein the reverse polarity protection circuit comprises a second transistor configured to connect the base of the transistor to the negative terminal.

7. The battery booster of claim 6, further comprising an over-voltage protection circuit configured to disable the transistor when a voltage of the power supply exceeds a preset voltage level.

8. The battery booster of claim 7, wherein the over-voltage protection circuit comprises a zener diode and a third transistor configured to connect the base of the transistor to the negative terminal.

9. The battery booster of claim 1, wherein the power supply further comprises a supercapacitor bank that is coupled in parallel with the lithium battery.

10. The battery booster of claim 9, wherein the battery booster is configured to charge the supercapacitor bank to a charge voltage that is greater than a rated voltage of the supercapacitor bank.

11. The battery booster of claim 10, wherein the battery booster is configured to maintain the supercapacitor bank at the charge voltage for a predetermined amount of time before discharging the supercapacitor bank until a measured voltage of the supercapacitor bank is less than or equal to the rated voltage.

12. The battery booster of claim 11, wherein the supercapacitor bank is configured to discharge into the lithium battery.

13. The battery booster of claim 1, further comprising a DC output configured to supply power to a portable electronic device, wherein the at least one processor is configured to disable the DC output when a current draw at the DC output is greater than a first predetermined current.

14. The battery booster of claim 13, wherein the at least one processor is further configured to disable the DC output when the current draw at the DC output is not greater than a second predetermined current after a predetermined amount of time.

15. A battery booster for jumpstarting a vehicle having an external battery, the battery booster comprising:
   a set of electrical conductors configured to couple with the external battery or with an engine electrically coupled with the external battery via a set of battery clamps,
   wherein the set of electrical conductors comprises a positive electrical conductor and a negative electrical conductor;
   a power supply configured to supply a starting current to jump start the vehicle via the set of electrical conductors,
   wherein the power supply comprises:
   a plurality of lithium battery cells arranged to form a lithium battery having a positive terminal and a negative terminal; and
   an internal heater configured to heat the power supply or a portion thereof;
   a boost switch positioned in-line between the power supply and the set of battery clamps on one of the set of electrical conductors; and
   at least one processor configured to output a control signal to close the boost switch as a function of one or more parameters of the power supply, the external battery, or the vehicle.

16. The battery booster of claim 15, wherein the internal heater is a positive temperature coefficient (PTC) heater.

17. The battery booster of claim 16, wherein the PTC heater is positioned between two of said plurality of lithium battery cells.

18. The battery booster of claim 16, wherein the PTC heater is powered by the lithium battery.

19. A battery booster for jumpstarting a vehicle having an external battery, the battery booster comprising:

a set of electrical conductors configured to couple with the external battery or with an engine electrically coupled with the external battery via a set of battery clamps, wherein the set of electrical conductors comprises a positive electrical conductor and a negative electrical conductor;

a power supply configured to supply a starting current to jump start the vehicle via the set of electrical conductors, wherein the power supply comprises a plurality of lithium battery cells arranged to form a lithium battery having a positive terminal and a negative terminal, and wherein the lithium battery is a removable battery;

a boost switch positioned in-line between the power supply and the set of battery clamps on one of the set of electrical conductors; and at least one processor configured to output a control signal to close the boost switch as a function of one or more parameters of the power supply, the external battery, or the vehicle.

20. The battery booster of claim 19, wherein the removable battery is a power tool battery and the battery booster is configured to authenticate the power tool battery.

*    *    *    *    *